United States Patent
Ikeda et al.

(10) Patent No.: US 8,465,711 B2
(45) Date of Patent: Jun. 18, 2013

(54) EXHAUST GAS PURIFICATION CATALYST AND METHOD FOR PURIFYING EXHAUST GAS BY USING SAME

(75) Inventors: Masanori Ikeda, Himeji (JP); Kosuke Mikita, Himeji (JP); Takahiro Ikegami, Himeji (JP); Yuji Ogino, Himeji (JP); Hideki Goto, Himeji (JP)

(73) Assignees: Umicore Shokubai Japan Co., Ltd., Tokyo (JP); Umicore Shokubai USA Inc., Auburn Hills, MA (US)

( * ) Notice: Subject to any disclaimer, the term of this patent is extended or adjusted under 35 U.S.C. 154(b) by 117 days.

(21) Appl. No.: 12/737,868

(22) PCT Filed: Aug. 27, 2009

(86) PCT No.: PCT/JP2009/004165
§ 371 (c)(1),
(2), (4) Date: Mar. 18, 2011

(87) PCT Pub. No.: WO2010/023919
PCT Pub. Date: Mar. 4, 2010

(65) Prior Publication Data
US 2011/0165045 A1 Jul. 7, 2011

(30) Foreign Application Priority Data

Aug. 27, 2008 (JP) ................. 2008-218397
Nov. 28, 2008 (JP) ................. 2008-305302
Mar. 6, 2009 (JP) ................. 2009-054149

(51) Int. Cl.
| | |
|---|---|
| *B01D 53/56* | (2006.01) |
| *B01D 53/94* | (2006.01) |
| *B01J 8/02* | (2006.01) |
| *B01J 23/00* | (2006.01) |
| *B01J 23/10* | (2006.01) |
| *B01J 23/42* | (2006.01) |
| *B01J 23/44* | (2006.01) |
| *B01J 23/08* | (2006.01) |
| *C01B 21/00* | (2006.01) |
| *C01B 23/00* | (2006.01) |
| *C01B 25/00* | (2006.01) |
| *C01B 31/00* | (2006.01) |
| *C01B 33/00* | (2006.01) |
| *C01B 35/00* | (2006.01) |
| *C01G 28/00* | (2006.01) |
| *C01G 30/00* | (2006.01) |

(52) U.S. Cl.
USPC ........ 423/213.5; 502/303; 502/304; 502/325; 502/339; 502/355

(58) Field of Classification Search
USPC ............ 502/303, 304, 325, 339, 355; 60/299; 423/213.5
See application file for complete search history.

(56) References Cited

U.S. PATENT DOCUMENTS 4,738,946 A  4/1988  Yamashita et al.
7,754,171 B2 * 7/2010  Chen et al. ................. 423/213.2
(Continued)

FOREIGN PATENT DOCUMENTS

EP  0 963 781  12/1999
JP  58 199832  11/1983
(Continued)

OTHER PUBLICATIONS

Azomoza, M. et al., "Synthesis of High Surface Area Supported $Pt SiO_2$ Catalysts from $H_2PtCl_6 \cdot 6H_2O$ by the Sol-Gel Method," Catalysis Today, pp. 547-554, 1992.

(Continued)

*Primary Examiner* — Anthony J Zimmer
(74) *Attorney, Agent, or Firm* — Harness, Dickey & Pierce, P.L.C.

(57) ABSTRACT

An exhaust gas purification catalyst of the present invention contains at least a precious metal coated with lanthanum-containing alumina. In at least one embodiment, it is possible to provide: an exhaust gas purification catalyst which can (i) have an increase in heat resistance, and (ii) inhibit the precious metal from being mixed in alumina and therefore inhibit the precious metal from forming a solid solution in combination with alumina; and a method for efficiently purifying, by use of the catalyst, an exhaust gas emitted from an internal-combustion engine.

22 Claims, 11 Drawing Sheets

U.S. PATENT DOCUMENTS

| | | | |
|---|---|---|---|
| 8,038,951 B2 * | 10/2011 | Wassermann et al. | 422/168 |
| 2008/0167181 A1 | 7/2008 | Nakamura et al. | |
| 2009/0025375 A1 * | 1/2009 | Poojary et al. | 60/295 |
| 2009/0111688 A1 | 4/2009 | Nakamura et al. | |
| 2009/0275467 A1 | 11/2009 | Shiratori et al. | |

FOREIGN PATENT DOCUMENTS

| | | |
|---|---|---|
| JP | 60-12132 | 1/1985 |
| JP | 61-4532 | 1/1986 |
| JP | 1-230425 | 9/1989 |
| JP | 7-194977 | 8/1995 |
| JP | 2642657 | 5/1997 |
| JP | 11-347410 | 12/1999 |
| JP | 2007-29778 | 2/2007 |
| JP | 2007-229641 | 9/2007 |
| JP | 2007-229653 | 9/2007 |
| JP | 2007-313500 | 12/2007 |
| JP | 2008-168192 | 7/2008 |
| WO | WO 2007/052627 | 5/2007 |
| WO | WO 2007/119658 | 10/2007 |

OTHER PUBLICATIONS

Hippe, C. et al., "Influence of the strong-metal-support interaction on the CO chemisorption at a $Pt/SiO_2$ catalyst," Catalysis Letters, pp. 195-199, 1997.

International Search Report dated Dec. 15, 2009.

Translation of Japanese Office Action for JP Patent Application No. 2009-270788.

* cited by examiner

EXHAUST GAS PURIFICATION CATALYST AND METHOD FOR PURIFYING EXHAUST GAS BY USING SAME

TECHNICAL FIELD

The present invention relates to: a purification catalyst for purifying an exhaust gas emitted from an internal-combustion engine; and a method for purifying an exhaust gas by using the purification catalyst. Specifically, the present invention relates to: an exhaust gas purification catalyst that contains a precious metal coated with lanthanum-containing alumina; and a method for purifying an exhaust gas by using the exhaust gas purification catalyst.

BACKGROUND ART

There has been disclosed a heat-resistant catalyst in which palladium is supported, as an active constituent, on a carrier which is mainly made from a composite oxide of aluminum and lanthanum. It has been reported that such a catalyst exhibits high methane combustion reactivity even after the catalyst is baked at 1200° C. for 3 hours (see Patent Literature 1, for example).

Further, it has been disclosed that a carrier which is made from (i) a composite oxide of $Al_2O_3$ derived from aluminum alkoxide, (ii) $CeO_2$, and (iii) $La_2O_3$ has a high surface area stability, and a catalyst in which a precious metal is supported on the carrier exhibits a high purification capability for a simulated automobile exhaust gas (see Patent Literature 2, for example).

In addition, it has been disclosed that a catalyst suppresses growth of metal particles and growth of particles of an oxygen occlusion/release material, the catalyst being such that (i) a carrier is made from a porous oxide derived from aluminum alkoxide, (ii) the carrier and the oxygen occlusion/release material are mixed with each other at an atomic level so as to form a composite oxide, and (iii) the metal is supported on the composite oxide (see Patent Literature 3, for example).

Further, it has been described that (i) a $Pt/SiO_2$ catalyst produced by a sol-gel method has Pt particles coated with $SiO_2$, and (ii) the catalyst can therefore inhibit sintering of the Pt particles (see Non-Patent Literature 1, for example). In addition, it has been described, as to the $Pt/SiO_2$ catalyst produced by the sol-gel method, that (i) there is high interactivity between the Pt particles and the coating $SiO_2$, and (ii) the Pt particles and the coating $SiO_2$ therefore form a compound such as a Pt—Si alloy or a $Pt_3Si$ (see Non-Patent Literature 2, for example).

Moreover, it has been disclosed that Pd is equally dispersed and heat deterioration can be suppressed in a case where (i) a Pd solution is mixed with a solution in which aluminum alkoxide and hexylene glycol are mixed with each other, and (ii) hydrolysis of alkoxide is then carried out (see Patent Literature 4, for example).

Further, it has been known that rhodium is mixed in alumina and forms a solid solution in combination with alumina, when the catalyst in which rhodium is supported on alumina is subjected to a high-temperature process. In this regard, there has been disclosed a method for recovering rhodium, in which an element is added to alumina so as to inhibit rhodium from being mixed in alumina (i.e. inhibit rhodium from forming the solid solution in combination with alumina), the element being selected from the group consisting of lanthanum, calcium, lead, and sodium (see Patent Literature 5, for example).

CITATION LIST

Patent Literature

Patent Literature 1
Japanese Patent Application Publication, Tokukaisho, No. 60-12132 A (Publication Date: Jan. 22, 1985)
Patent Literature 2
Japanese Patent Application Publication, Tokukaihei, No. 01-230425 A (Publication Date: Sep. 13, 1989)
Patent Literature 3
Japanese Patent Application Publication, Tokukaihei, No. 11-347410 A (Publication Date: Dec. 21, 1999)
Patent Literature 4
Japanese Patent Application Publication, Tokukaihei, No. 07-194977 A (Publication Date: Aug. 1, 1995)
Patent Literature 5
Japanese Patent Application Publication, Tokukaisho, No. 58-199832 A (Publication Date: Nov. 21, 1983)

Non-Patent Literature

Non-Patent Literature 1
Catalysis Today, 15 (1992), 547-554
Non-Patent Literature 2
Catalysis Letters, 43 (1997), 195-199

SUMMARY OF INVENTION

Technical Problem

Each of the catalysts disclosed in Patent Literatures 1 and 2 has an improved heat resistance of alumina which serves as a carrier for supporting a precious metal, and therefore has an advantage of inhibiting, to a certain degree, the sintering of the metal particles. However, such a catalyst contains a large part of precious metal particles on a surface of a carrier substrate which is improved in heat resistance (see (c) of FIG. 1). This gives rise to a problem that the sintering of the precious metal particles is likely to occur, in a case where the catalyst is used at a high temperature, or is subjected to a high-temperature durability process for a long time (see (c) of FIG. 2). Such sintering reduces a purification capability of the catalyst.

The catalyst disclosed in Patent Literature 3 also contains a large part of the precious metal particles on the surface of the carrier substrate. That is, there are few physical barriers for inhibiting the sintering of the precious metal particles. This gives rise to a problem that the sintering of the precious metal particles is likely to occur in a case where the catalyst is used at a high temperature, or is subjected to a high-temperature durability process for a long time. Such sintering reduces a purification capability of the catalyst.

On the other hand, the Pt particles described in Non-Patent Literature 1 are coated with $SiO_2$ by the sol-gel method so that the sintering is inhibited. However, high interactivity between the precious metal and the coating material, caused by the aforementioned coating state, gives the catalyst a property different from the property of the catalyst (i) which is obtained by an impregnation method and (ii) in which the large part of the precious metal is supported on the surface of the existing carrier. Therefore, the structure described in Non-Patent Literature 1 is poor in catalyst capability. In other words, the structure in which only the precious metal is coated is poor in catalyst capability for an exhaust gas which has a fluctuation in air-fuel ratio.

Further, the catalyst in which the precious metal, serving as a catalyst active constituent, is coated with an inorganic oxide or the like has such a problem that the exhaust gas is not likely to reach the precious metal, as compared with a catalyst in which the precious metal is not coated with an inorganic oxide or the like.

On the other hand, Patent Literature 4 discloses a catalyst in which the Pd particles are coated with alumina. The catalyst can suppress heat deterioration even in a case where $Al_2O_3$ derived from aluminum alkoxide is used as the coating material.

However, in a case where a precious metal other than Pd, such as rhodium, is coated with alumina, an interface between the precious metal particles and alumina particles becomes larger, as compared with the ones of the catalysts disclosed in Patent Literature 1 and 2. This gives rise to such a problem that the precious metal particles are likely to be mixed in alumina and forms a solid solution in combination with alumina (see (b) of FIG. 2). That is, in a case where the precious metal is mixed in alumina and forms the solid solution in combination with alumina, the precious metal cannot efficiently work as a catalyst.

Patent Literature 5 discloses a technique for recovering rhodium by inhibiting rhodium from being mixed in alumina and therefore inhibiting rhodium from forming a solid solution in combination with alumina. The technique, however, does not provide the structure in which rhodium is coated with alumina. On this account, the technique cannot be expected to improve the heat resistance of the purification catalyst for the exhaust gas emitted from the internal-combustion engine.

The present invention is made in view of the problems. An object of the present invention is to provide: an exhaust gas purification catalyst which (i) has an improvement in heat resistance by coating a precious metal with alumina, and (ii) inhibits the precious metal from being mixed in alumina and therefore inhibits the precious metal from forming a solid solution in combination with alumina; a method for producing the catalyst; and a method for efficiently purifying an exhaust gas emitted from an internal-combustion engine by using the catalyst.

Solution to Problem

The inventors of the present invention have found that a catalyst in which a precious metal (such as rhodium) is coated with lanthanum-containing alumina can (i) have an increase in heat resistance of the catalyst and (ii) inhibit the precious metal from being mixed in alumina and therefore inhibit the precious metal from forming a solid solution in combination with alumina.

The inventors of the present invention have further found that in a case where the precious metal is coated with a coating material, it becomes possible to inhibit sintering of the precious metal particles during a high-temperature durability process. Note, however, that the inventors of the present invention have considered that a fluctuation in air-fuel ratio in the vicinity of the precious metal cannot be sufficiently eased due to the above coating state, which precious metal serves as an active constituent of the catalyst. In this regard, the inventors of the present invention have found that in a case where a complex made of a precious metal and a cerium oxide (hereinafter, referred to as "precious metal-cerium oxide complex", in some cases) is coated with lanthanum-containing alumina, (i) the sintering can be suppressed, and (ii) an exhaust gas purification catalyst having a superior catalyst capability can be obtained.

The inventors of the present invention have further found that in a case where (i) the complex made of the precious metal and the cerium oxide is coated with lanthanum-containing alumina, (ii) a pore diameter of the catalyst is set to be within a predetermined range, and (iii) a pore volume of the catalyst is set to be within a predetermined range, it becomes possible to obtain an exhaust gas purification catalyst which exhibits a further superior catalyst capability, after the catalyst is exposed to an atmosphere having a high temperature. On the basis of the findings, the inventors of the present invention have realized the present invention.

That is, an exhaust gas purification catalyst of the present invention contains at least a precious metal coated with lanthanum-containing alumina.

In a case where the precious metal is coated with alumina, it becomes possible to (i) increase a heat resistance of the catalyst and (ii) inhibit heat deterioration of the catalyst. However, with the structure in which the precious metal is merely coated with alumina, it is impossible to (i) inhibit the precious metal from being mixed in alumina and (ii) inhibit the precious metal from forming a solid solution in combination with alumina. The formation of the solid solution reduces the catalyst capability. In this regard, according to the structure described above, the precious metal is coated with lanthanum-containing alumina, so that it becomes possible to inhibit the precious metal from being mixed in alumina and inhibit the precious metal from forming the solid solution in combination with alumina (later described in Examples, in detail). It is thus possible to efficiently purify an exhaust gas emitted from an internal-combustion engine, even after the catalyst is subjected to a high-temperature durability process.

The exhaust gas purification catalyst of the present invention preferably keeps containing the precious metal coated with lanthanum-containing alumina even after the exhaust gas purification catalyst is exposed to an oxygen-excess gas having a temperature in a range of 950° C. to 1000° C.

According to the structure, the exhaust gas purification catalyst still keeps containing the precious metal coated with lanthanum-containing alumina, even after it is exposed to the oxygen-excess atmosphere having a high temperature in a range of 950° C. to 1000° C. (hereinafter, also called "high-temperature durability process"). That is, it is believed that the precious metal is highly inhibited from being mixed in alumina and from forming a solid solution in combination with alumina. Accordingly, it is possible to stably purify an exhaust gas even after the catalyst is subjected to a high-temperature durability process.

In the exhaust gas purification catalyst of the present invention, an exposed surface area of the precious metal is preferably reduced or unchanged in a case where the exhaust gas purification catalyst is exposed to the foregoing gas.

Note that the exposed surface area of the precious metal (exposed precious metal surface area) is a value obtained by use of a formula of "the number of CO molecules adsorbed to 1 g of the catalyst"×"(lattice constant of the precious metal)$^2$". The "number of CO molecules" can be found by a CO pulse method (Catalyst, 1986, vol. 28, No. 1). For example, a lattice constant of rhodium is 3.8030.

It is believed that there is the precious metal that (i) has been mixed in alumina and (ii) has formed a solid solution in combination with alumina, in a case where the following conditions are satisfied: (1) the exposed surface area of the precious metal is increased through the high-temperature durability process; and (2) an atom ratio of the precious metal that has been mixed in alumina (the precious metal that has formed the solid solution in combination with alumina) has a positive value (later described in detail). In other words, it is believed that the formation of the solid solution of the precious metal and alumina is inhibited in a case where the exposed surface area of the precious metal is reduced or unchanged through the high-temperature durability process.

Therefore, the catalyst having the foregoing structure can cause the precious metal to sufficiently exhibit its catalyst ability. Accordingly, it is possible to efficiently purify an exhaust gas even after the catalyst is subjected to the high-temperature durability process.

In the exhaust gas purification catalyst of the present invention, 20% or less of the precious metal in atomic ratio is preferably mixed into alumina to form a solid solution of alumina and the precious metal after the exhaust gas purification catalyst is exposed to said gas.

The "ratio of atoms of the precious metal" is a parameter obtained by an X-ray photoelectron spectroscopy (XPS) method. In a case where, for example, the precious metal is rhodium, the "ratio of atoms of the precious metal that has been mixed in alumina and therefore has formed a solid solution in combination with alumina" is a percentage obtained by dividing an area of a peak of the rhodium that has formed the solid solution in combination with alumina by a total area of peaks of nonvalent rhodium, trivalent rhodium, and the rhodium that has formed the solid solution in combination with alumina. The lower the ratio of atoms of the precious metal that has formed the solid solution in combination with alumina is, the more successfully the formation of the solid solution of rhodium and alumina is inhibited.

According to the structure, the formation of the solid solution of the precious metal and alumina is significantly inhibited. Therefore, it is possible to cause the precious metal to effectively function as a catalyst. Accordingly, it is possible to efficiently purify an exhaust gas emitted from an internal-combustion engine even after the catalyst is subjected to the high-temperature durability process.

The exhaust gas purification catalyst of the present invention preferably further contains platinum and/or palladium. These precious metals have a catalytic property. Therefore, by additionally using such precious metals, it becomes possible to cause the exhaust gas purification catalyst to have a higher exhaust gas purification ability.

In the exhaust gas purification catalyst of the present invention, a complex made of a precious metal and a cerium oxide is preferably coated with lanthanum-containing alumina.

According to the structure, the complex made of the precious metal and the cerium oxide is coated with lanthanum-containing alumina. Therefore, it becomes possible to not only (i) increase the heat resistance and (ii) inhibit the sintering of the precious metal but also (iii) increase an oxygen absorption. The higher oxygen absorption allows the catalyst to have a higher catalyst capability.

Accordingly, it is possible to efficiently purify an exhaust gas emitted from an internal-combustion engine even after the catalyst is subjected to the high-temperature durability process. That is, it becomes possible to provide: an exhaust gas purification catalyst which can achieve both (i) an increase in heat resistance, which is realized by coating the precious metal with alumina, and (ii) inhibition of a reduction in ability to ease a fluctuation in air-fuel ratio, and also has a high oxygen occlusion/release ability while the precious metal is coated with alumina; and a method for efficiently purifying an exhaust gas emitted from an internal-combustion engine by using the exhaust gas purification catalyst.

It is possible to increase the heat resistance of the catalyst and inhibit the heat deterioration of the catalyst, by coating the precious metal with alumina. Note, however, that in a case where only the precious metal is coated with alumina, there may be a case where the catalyst does not effectively work. This is because the precious metal, which serves as a catalyst active constituent, and the cerium oxide, which serves as an oxygen occlusion material, are located away from each other, even if the cerium oxide is added to a position other than the coating layer of alumina.

In the exhaust gas purification catalyst of the present invention, a compound made of the precious metal and cerium is preferably formed at an interface between the precious metal and the cerium oxide in the complex.

The compound formed at an interface between the precious metal and the cerium oxide can function as an index for indicating that the precious metal and the cerium oxide are in contact with each other, and therefore forms a complex. Accordingly, it is believed that the catalyst in which the compound is formed at the interface between the precious metal and the cerium oxide has a high oxygen absorption and a high catalyst capability.

In the exhaust gas purification catalyst of the present invention, an amount of the cerium oxide contained in the complex is preferably greater than an amount of the compound contained in the complex.

As described above, the compound formed at the interface between the precious metal and the cerium oxide can function as the index indicating that the precious metal and the cerium oxide are in contact with each other, and therefore form the complex. However, the compound thus formed no longer functions as the oxygen occlusion/release material. Therefore, in a case where the amount of the cerium oxide contained in the complex is greater than the amount of the compound contained in the complex, it is possible to cause the catalyst to have a high oxygen absorption and a high catalyst capability.

In the exhaust gas purification catalyst of the present invention, the amount of the cerium oxide contained in the complex is preferably in a range of 1% by mass to 30% by mass with respect to a total amount of the precious metal, the cerium oxide, lanthanum, and alumina, each of which is contained in the exhaust gas purification catalyst.

According to the structure, a fluctuation in air-fuel ratio in the vicinity of the precious metal is suitably eased, which precious metal serves as the catalyst active constituent.

In the exhaust gas purification catalyst of the present invention, the exhaust gas purification catalyst preferably keeps containing the complex coated with lanthanum-containing alumina, even after the exhaust gas purification catalyst is exposed to an exhaust gas having a temperature in a range of 950° C. to 1000° C. (hereinafter, referred to as "after the high-temperature durability process", in some cases, in the present specification), the exhaust gas being emitted from an internal-combustion engine.

According to the structure, the exhaust gas purification catalyst keeps containing the complex that is coated with lanthanum-containing alumina, even after the catalyst is subjected to the high-temperature durability process. Therefore, oxygen can be occluded/released in the coating layer, even after the catalyst is subjected to the high-temperature durability process. Accordingly, it is possible to stably purify an exhaust gas even after the catalyst is subjected to the high-temperature durability process.

In the exhaust gas purification catalyst of the present invention, in a case where the exhaust gas purification catalyst is exposed to the foregoing gas, an exposed surface area of the precious metal is preferably reduced by a percentage in a range of 0% to 87% with respect to an exposed surface area of the precious metal before the exposure of the exhaust gas purification catalyst.

In a case where the reduction rate of the exposed surface area of the precious metal is within the foregoing range, it is believed that heat contraction of alumina and the sintering of the precious metal are highly inhibited, even after the catalyst is subjected to the high-temperature durability process. Therefore, it is possible to purify an exhaust gas emitted from the internal-combustion engine more efficiently, even after the catalyst is subjected to the high-temperature durability process.

In the exhaust gas purification catalyst of the present invention, an oxygen absorption of the exhaust gas purification catalyst preferably is within a range of 30% to 100%.

In a case where the oxygen absorption is within the foregoing range, it is believed that the catalyst has a high oxygen occlusion/release ability. Therefore, it is possible to purify an exhaust gas emitted from the internal-combustion engine more efficiently, even after the catalyst is subjected to the high-temperature durability process.

The exhaust gas purification catalyst of the present invention preferably further contains platinum and/or palladium, neither of which is coated with lanthanum-containing alumina.

These precious metals have a catalytic property. Therefore, by additionally using such precious metals in addition to rhodium, it becomes possible to cause the exhaust gas purification catalyst of the present invention to have a further higher exhaust gas purification ability.

In the exhaust gas purification catalyst of the present invention, a pore volume of pores of not less than 160 nm but less than 1000 nm in diameter preferably accounts for 5% to 20% in a total pore volume of the exhaust gas purification catalyst.

According to the structure, the pore size distribution of the exhaust gas purification catalyst is within the foregoing range. Therefore, it is possible to (i) prevent a reduction in catalyst capability due to the durability process, and (ii) allow an exhaust gas to efficiently reach the precious metal. It is thus possible to efficiently purify the exhaust gas even after the catalyst is subjected to the high-temperature durability process.

Accordingly, it is possible to provide an exhaust gas purification catalyst having a superior catalyst capability even after the catalyst is subjected to the high-temperature durability process.

In the exhaust gas purification catalyst of the present invention, a pore volume of pores of less than 160 nm in diameter preferably accounts for 70% to 90% in the total pore volume of the exhaust gas purification catalyst.

According to the structure, it is possible to efficiently purify an exhaust gas while the precious metal is coated with lanthanum-containing alumina or both the precious metal and the cerium oxide are coated with lanthanum-containing alumina.

The exhaust gas purification catalyst of the present invention is preferably supported on a three-dimensional structure.

According to the structure, the exhaust gas purification catalyst can be efficiently supported in a case where the three-dimensional structure having a large surface area is employed. Therefore, it is possible to increase exhaust gas purification efficiency of the exhaust gas purification catalyst.

The exhaust gas purification catalyst of the present invention preferably further contains a fire-resistant inorganic oxide.

According to the structure, the complex is dispersed due to the fire-resistant inorganic oxide. Therefore, it is possible to cause an exhaust gas to be in contact with the exhaust gas purification catalyst more efficiently. Accordingly, it is possible to additionally achieve such an effect that an exhaust gas can be purified more efficiently under a high-temperature condition.

In the exhaust gas purification catalyst of the present invention, a melting point of the fire-resistant inorganic oxide is preferably not less than 1000° C.

The exhaust gas purification catalyst of the present invention preferably further contains a cerium oxide and/or a ceria-zirconia composite oxide, neither of which is coated with lanthanum-containing alumina.

Each of the cerium oxide and the ceria-zirconia composite oxide can function as (i) the oxygen occlusion/release material and (ii) a promoter. Therefore, each of these has a function of increasing the heat resistance of the exhaust gas purification catalyst and a function of inducing oxidation-reduction reaction which is caused by active species of the exhaust gas purification catalyst. Accordingly, it becomes possible to purifying an exhaust gas under a high-temperature condition more efficiently.

In the exhaust gas purification catalyst of the present invention, the precious metal coated with lanthanum-containing alumina is preferably rhodium. Rhodium has a high three-way catalyst capability. Therefore, by selecting rhodium as the precious metal, it becomes possible to purify an exhaust gas more efficiently.

A method of the present invention, for purifying an exhaust gas, includes the step of exposing an exhaust gas purification catalyst of the present invention to an exhaust gas emitted from an internal-combustion engine.

As described above, the exhaust gas purification catalyst of the present invention has a heat resistance, and an effect of inhibiting the precious metal from forming a solid solution. According to the method, it is thus possible to (i) carry out an exhaust gas purification process by sufficiently taking advantage of catalyst activity of the precious metal, and (ii) purify an exhaust gas under a high-temperature condition highly efficiently. Accordingly, it is possible to efficiently purify the exhaust gas emitted from the internal-combustion engine.

A method of the present invention, for purifying an exhaust gas, preferably includes the steps of: (i) exposing the exhaust gas purification catalyst to another exhaust gas which has (1) a temperature in a range of 800° C. to 1000° C. and (2) an air-fuel ratio in a range of 10 to 18.6; and (ii) exposing, after the step (i), the exhaust gas purification catalyst to the exhaust gas which (I) has a temperature in a range of 0° C. to 750° C., and (II) is emitted from the internal-combustion engine.

The air-fuel ratio is an approximate value of a theoretical air-fuel ratio for a gasoline engine. Therefore, according to the method, it is possible to, as a matter of course, purify an exhaust gas emitted from the internal-combustion engine while an automobile or the like, employing the internal-combustion engine, is driven normally. Further, according to the method, even if an exhaust gas having a high temperature in a range of 800° C. to 1000° C. flows into the exhaust gas purification catalyst while (i) the automobile is being driven or (ii) the exhaust gas purification catalyst is being subjected to a durability test, it is possible to (1) inhibit the sintering of the precious metal and (2) causing the exhaust gas purification catalyst to exhibit its oxygen occlusion/release ability in the vicinity of the precious metal. This eases the fluctuation in air-fuel ratio. Note that the air-fuel ratio is an approximate value of the theoretical air-fuel ratio for the gasoline engine. Therefore, according to the method, it is possible to efficiently purify an exhaust gas, particularly, the exhaust gas emitted from the gasoline engine.

In order to attain the object, a method of the present invention, for producing an exhaust gas purification catalyst of the present invention, includes the step of producing a gel in which a complex made of a precious metal and a cerium oxide is coated with a lanthanum-containing alumina gel.

According to the method, in a case where, for example, a catalyst composition is supported on a three-dimensional structure, it is unnecessary to carry out a baking step before coating the three-dimensional structure with the catalyst composite by washcoating. That is, for the production of the exhaust gas purification catalyst, it is necessary to carry out the baking step only after the three-dimensional structure is coated with the catalyst composite by the washcoating. The number of times that the baking is carried out can be thus reduced, so that a time period for producing the exhaust gas purification catalyst can be reduced. Therefore, it becomes possible to produce, at lower cost and with higher production efficiency, an exhaust gas purification catalyst that has a superior catalyst capability even after the catalyst is subjected to an atmosphere having a high temperature.

Note that although Patent Literatures (Japanese Patent Application Publication, Tokukaisho, No. 61-4532, Japanese Patent Publication No. 2642657) describe a method in which a catalyst is prepared with the alumina sol, such a method requires drying and baking a sol or gel at least twice. That is, the method has a problem that (i) cost for preparing the catalyst (such as cost for the drying and the baking) becomes higher and (ii) a time period for preparing the catalyst becomes longer.

The method of the present invention, for producing an exhaust gas purification catalyst, preferably further includes the steps of: turning, into a slurry, the gel in which the complex made of the precious metal and the cerium oxide is coated with the lanthanum-containing alumina gel; coating a three-dimensional structure with the slurry by washcoating; and drying and baking the three-dimensional structure which is coated with the slurry by the washcoating.

According to the method, it becomes unnecessary to carry out a step for turning the gel into powder by carrying out the drying and baking step. Therefore, it becomes possible to reduce the time period and cost for the production of the exhaust gas purification catalyst. Accordingly, it is possible to produce, at lower cost and with higher production efficiency, an exhaust gas purification catalyst which has a superior catalyst capability even after the exhaust gas purification catalyst is subjected to a high-temperature atmosphere.

Note that it has been general that a structure in which a precious metal is coated with an inorganic oxide is produced through a step for turning, into powder, a gel or the like in which the precious metal is coated, the foregoing step including the drying and baking step. The reason why the general production method includes the step for turning the gel into the powder may be explained by the following three points: (1) There has not been proposed such an idea that the three-dimensional structure can be coated with, by the washcoating, the gel itself in which the precious metal is coated, after the gel is turned into a slurry. (2) There has not been proposed such an idea that the gel can maintain the structure in which the precious metal is coated because the gel is turned into sol due to stress. (3) It has been difficult to coat the three-dimensional structure with only the gel by the washcoating because of a high viscosity of the gel.

Advantageous Effects of Invention

An exhaust gas purification catalyst of the present invention contains at least a precious metal coated with lanthanum-containing alumina.

Therefore, it is possible to, by use of the catalyst, efficiently purify an exhaust gas emitted from an internal-combustion engine even after the catalyst is subjected to a high-temperature durability process.

Further, a method of the present invention, for purifying an exhaust gas, includes the step of exposing an exhaust gas purification catalyst of the present invention to an exhaust gas emitted from an internal-combustion engine.

Therefore, it is possible to carry out an exhaust gas purification process by efficiently taking advantage of catalyst activity of the precious metal, and efficiently purify the exhaust gas emitted from the internal-combustion engine.

Further, a method of the present invention, for producing an exhaust gas purification catalyst, includes the step of producing a gel in which a complex made of the precious metal and a cerium oxide is coated with a lanthanum-containing alumina gel.

Therefore, it is possible to produce, at lower cost and with higher production efficiency, an exhaust gas purification catalyst which has a superior catalyst capability even after the exhaust gas purification catalyst is subjected to an atmosphere having a high temperature.

DESCRIPTION OF EMBODIMENTS

One embodiment of the present invention is described below in detail. Note, however, that the present invention is not limited to the embodiment.

All of Non-Patent Literatures and Patent Literatures described in the present specification are incorporated herein by reference. Further, each of various physical properties described in the present specification is a value measured by a corresponding method described in the following Examples, unless otherwise noted.

In the present specification, the expression " . . . to." means "not less than . . . but not more than.". For example, in the present specification, "0.5% by mass to 30% by mass" means "not less than 0.5% by mass but not more than 30% by mass". Further, in the present specification, the wording "and/or" means "both of or one of". Furthermore, in the present specification, the term "sintering" means such a state that particles gather together into larger blocks as being exposed to an atmosphere having a high temperature.

(I) Exhaust Gas Purification Catalyst (i) Structure of Exhaust Gas Purification Catalyst <Catalyst Containing Precious Metal Coated with Lanthanum-Containing Alumina>

An exhaust gas purification catalyst of the present invention contains at least a precious metal coated with lanthanum-containing alumina.

Here, the wording "at least" means that the exhaust gas purification catalyst of the present invention can contain a component(s) other than the precious metal coated with lanthanum-containing alumina. For example, the exhaust gas purification catalyst of the present invention can further contain, if necessary: platinum and/or palladium; a fire-resistant inorganic oxide; a cerium oxide and/or a ceria-zirconia composite oxide; and other materials (later described in detail).

Here, the description "precious metal coated with lanthanum-containing alumina" means that lanthanum-containing alumina is supported while being adjacent to the precious metal particles, and the description "supported while being adjacent to the precious metal particles" means that alumina particles and the precious metal particles are partially in contact with each other so that a molecule (such as carbon monoxide (CO)) cannot be adsorbed to a monodisperse precious metal particle at an interface between the alumina particles and the precious metal particles, the molecule normally being able to be adsorbed to the monodisperse precious metal particle.

It is preferable that the precious metal is rhodium. The following description deals with an example in which rhodium is used as the precious metal, with reference to FIGS. 1 and 2. Note, however, that the present invention is not limited to this, and rhodium may be replaced with another precious metal (later described).

Figure 1:
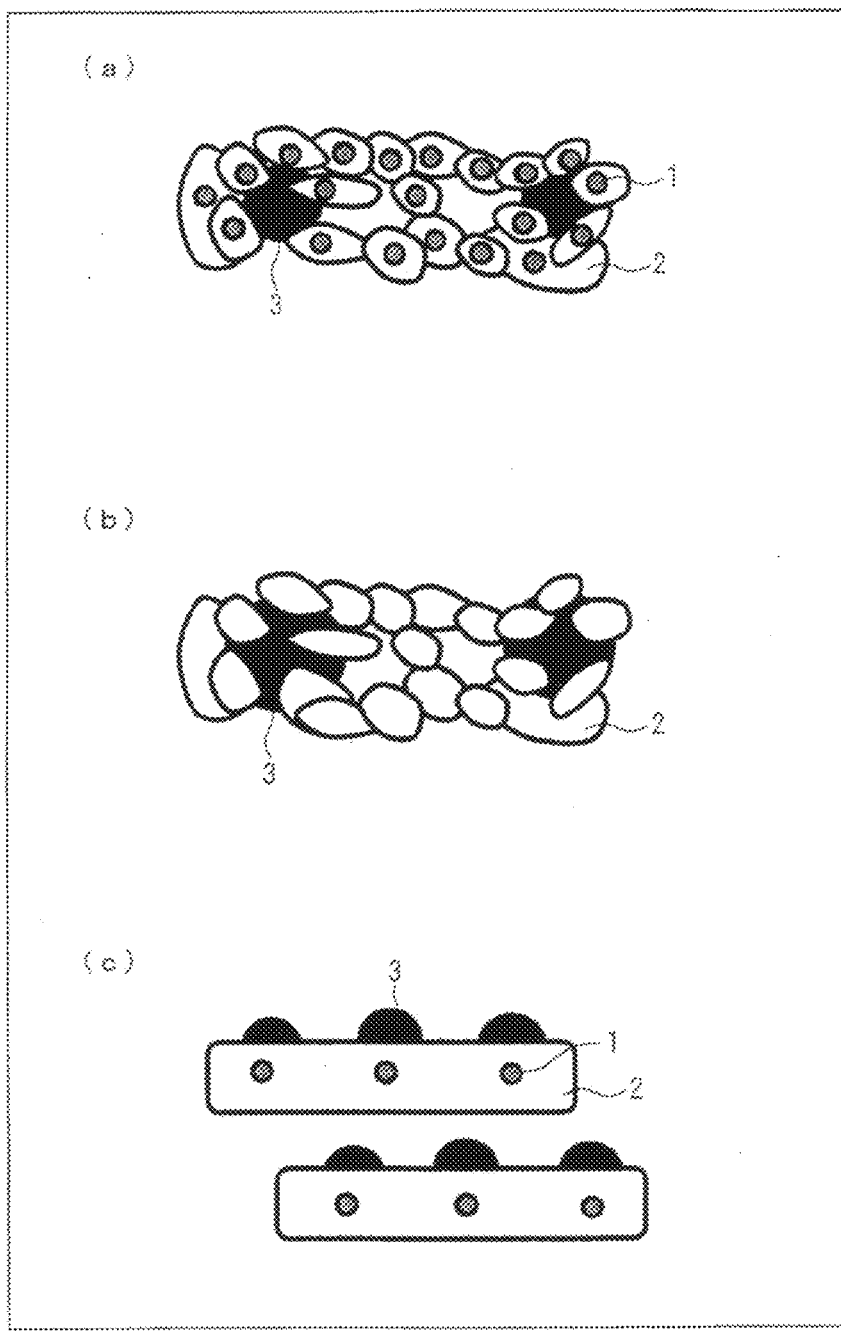
FIG. 1 is a plan view schematically illustrating catalysts each of which has not been subjected to a durability process.

FIG. 1 is a plan view schematically illustrating catalysts each of which has not been subjected to a durability process. Note that each of FIGS. 1 through 6 attached to the present specification is a view schematically illustrating a positional relationship between components of a catalyst, and does not show an actual distance, an actual shape, nor an actual particle diameter.

In FIG. 1, "1" indicates lanthanum, "2" indicates alumina, and "3" indicates rhodium. In each of (a) through (c) of FIG. 1, only a single piece of alumina is pointed with the sign "2" but any pieces having a white irregular shape in (a) and (b) of FIG. 1, and any pieces having a substantial rectangular shape in (c) of FIG. 1 indicate alumina. Further, in each of (a) and (c) of FIG. 1, only a single piece of lanthanum is pointed with the sign "1" but any gray spheres in alumina in (a) and (c) of FIG. 1 indicate lanthanum. Furthermore, in each of (a) through (c) of FIG. 1, only a single piece of rhodium is pointed with the sign "3" but any pieces painted in black in (a) through (c) of FIG. 1 indicate rhodium. This applies to signs other than the signs 1 through 3. Further, this applies to FIGS. 2 through 6.

(a) of FIG. 1 is a plan view schematically illustrating a state where lanthanum-containing alumina is supported while being adjacent to rhodium particles.

In a case where a particle diameter of rhodium coated with lanthanum-containing alumina (like the one illustrated in (a) of FIG. 1) is measured by a CO pulse adsorption method (Reference Document: Catalyst, 1986, vol. 28. No. 1), the diameter thus measured becomes larger than an actual rhodium particle diameter. This is because CO cannot be adsorbed to the interface between alumina and rhodium, as described above.

In the present specification, the wording "durability process" or "high-temperature durability process" means such that the catalyst is exposed to an atmosphere at a temperature in a range of 800° C. to 1000° C., more specifically, exposed to an oxygen-excess atmosphere at a temperature in a range of 950° C. to 1000° C.

(b) of FIG. 1 is a plan view schematically illustrating a state where rhodium is coated with alumina containing no lanthanum.

(b) of FIG. 1 illustrates a structure in which the rhodium particles and the alumina particles are partially in contact with each other in a manner similar to the structure in which rhodium is coated with lanthanum-containing alumina. In this case, the particle diameter of rhodium, calculated by the CO pulse adsorption method, becomes larger than the actual rhodium particle diameter. This is because CO cannot be adsorbed to the interface between the rhodium particles and the alumina particles, in a manner similar to the structure in which rhodium is coated with lanthanum-containing alumina.

Meanwhile, according to a method such as an impregnation method in which an existent carrier is immersed in a precious metal solution so as to support the precious metal, a large part of the rhodium particles is supported on a surface of the carrier. (c) of FIG. 1 is a plan view schematically illustrating how rhodium is supported in a catalyst which is prepared by the impregnation method.

In the state illustrated in (c) of FIG. 1, the rhodium particle diameter calculated by the CO pulse adsorption method is substantially identical with the actual rhodium particle diameter.

As described above, the rhodium particles coated with alumina have a larger interface between the rhodium particles and the alumina particles than that of the structure obtained by the impregnation method or the like, regardless of whether or not alumina for coating rhodium contains lanthanum.

It has been generally known that in a case where the catalyst is subjected to the durability process at a temperature higher than 1000° C. under the presence of an oxygen-excess atmosphere, rhodium is mixed in alumina and forms a solid solution in combination with alumina, even with the structure in which rhodium is supported on alumina as illustrated in (c) of FIG. 1 (i.e. even in the case where the interface between the rhodium particles and the alumina particles is small). On the other hand, rhodium is not likely to (i) be mixed in alumina and (ii) form the solid solution in combination with alumina, in a case where the durability process is carried out at a low temperature. In view of such characteristics, the following Examples employ, as their thresholds, the conditions of (i) the durability process at 950° C. for 50 hours under the presence of the oxygen-excess atmosphere, and (ii) the durability process at 1000° C. for 48 hours under the presence of the oxygen-excess atmosphere.

Here, in the present specification, either the wording "under the presence of the oxygen-excess atmosphere" or the wording "oxygen-excess" means either (i) a case where a total concentration of an oxidized gas is higher than that of a reducing gas or (ii) a case where an air-fuel ratio of the exhaust gas is greater than 14.65. Examples of the oxidized gas encompass $O_2$ and $NO_x$, whereas examples of the reducing gas encompass HC and CO.

The following description explains the reason why the thresholds are set to be 950° C. and 1000° C. A catalyst bed has its highest temperature while a vehicle is driven at a high speed or the catalyst is subjected to a durability test. The highest temperature is approximately 1000° C. Although there are cases where the catalyst bed temperature becomes higher than 1000° C. due to: an excessive supply of a fuel caused by an error in control of an engine or the like; abnormal combustion of soot attached to the catalyst or the fuel; or another failure, it is not necessary to take into consideration, for a normal driving condition, such unusual cases. Further, the precious metal such as rhodium is not likely to (i) be mixed in alumina and (ii) form a solid solution in combination with alumina, in a case where the durability process is carried out at a temperature lower than 950° C. For this reason, in order to identify the precious metal mixed in alumina, the present embodiment does not employ a temperature lower than 950° C. for the durability process.

Although how long the catalyst is subjected to the durability process is not particularly limited, it is preferable to cause the catalyst to be subjected to the durability process for 5 hours to 100 hours, more preferably 10 hours to 50 hours. This is because: the durability process carried out for less than 5 hours is not enough to confirm resistance of rhodium to be mixed in alumina (resistance of rhodium to the formation of the solid solution in combination with alumina) or resistance of the precious metal to the sintering; whereas the durability process carried out for more than 100 hours provides only a small change in the condition of the catalyst as compared with the durability process carried out for not more than 100 hours, and such a small change does not match a disadvantage of an increase in cost.

The exhaust gas purification catalyst of the present embodiment keeps containing rhodium coated with lanthanum-containing alumina even after the catalyst is exposed to an oxygen-excess gas having a temperature in a range of 950° C. to 1000° C. That is, (i) the exhaust gas purification catalyst of the present embodiment can inhibit rhodium from being mixed in alumina and therefore inhibit rhodium from forming a solid solution in combination with alumina, even if the exhaust gas purification catalyst is exposed to an atmosphere having a temperature equal to the highest catalyst bed temperature, and (ii) the exhaust gas purification catalyst of the present embodiment can cause rhodium to function as the catalyst even after the exhaust gas purification catalyst is subjected to the durability process.

How to expose the exhaust gas purification catalyst of the present embodiment to the foregoing gas is not particularly limited. The catalyst may be provided at an arbitral position in an exhaust pipe of an internal-combustion engine so as to be exposed to the foregoing gas.

Further, the foregoing gas is preferably, but not particularly limited to, an exhaust gas emitted from the internal-combustion engine. Components of the exhaust gas emitted from the internal-combustion engine include: nitrogen oxides (NOX (such as NO and $NO_2$), $N_2O$, and the like); carbon monoxide; carbon dioxide; oxygen; hydrogen; ammonia; water; a sulfur dioxide; and various hydrocarbons, for example.

The internal-combustion engine is not particularly limited. Examples of the internal-combustion engine encompass: a gasoline engine; a hybrid engine; and an engine which uses a fuel such as a natural gas, ethanol, dimethyl ether or the like. It is preferable that the internal-combustion engine is the gasoline engine.

Here, in the present specification, the description "expose the exhaust gas purification catalyst to the gas" means a situation in which the catalyst and the gas are in contact with each other. This includes not only a situation in which all of the surface of the catalyst is in contact with the gas but also a situation in which the surface of the catalyst is only partially in contact with the gas.

Further, the description "mixed in . . . and therefore forms a solid solution" generally means a state where different materials are equally mixed with each other. Note, however, that in the present specification, the foregoing description is not limited to the state of "equally mixed with each other" but includes such a state where the rhodium atoms which have been exposed to a gas phase are embedded into the alumina particles and therefore are no longer exposed to the gas phase.

Figure 2:
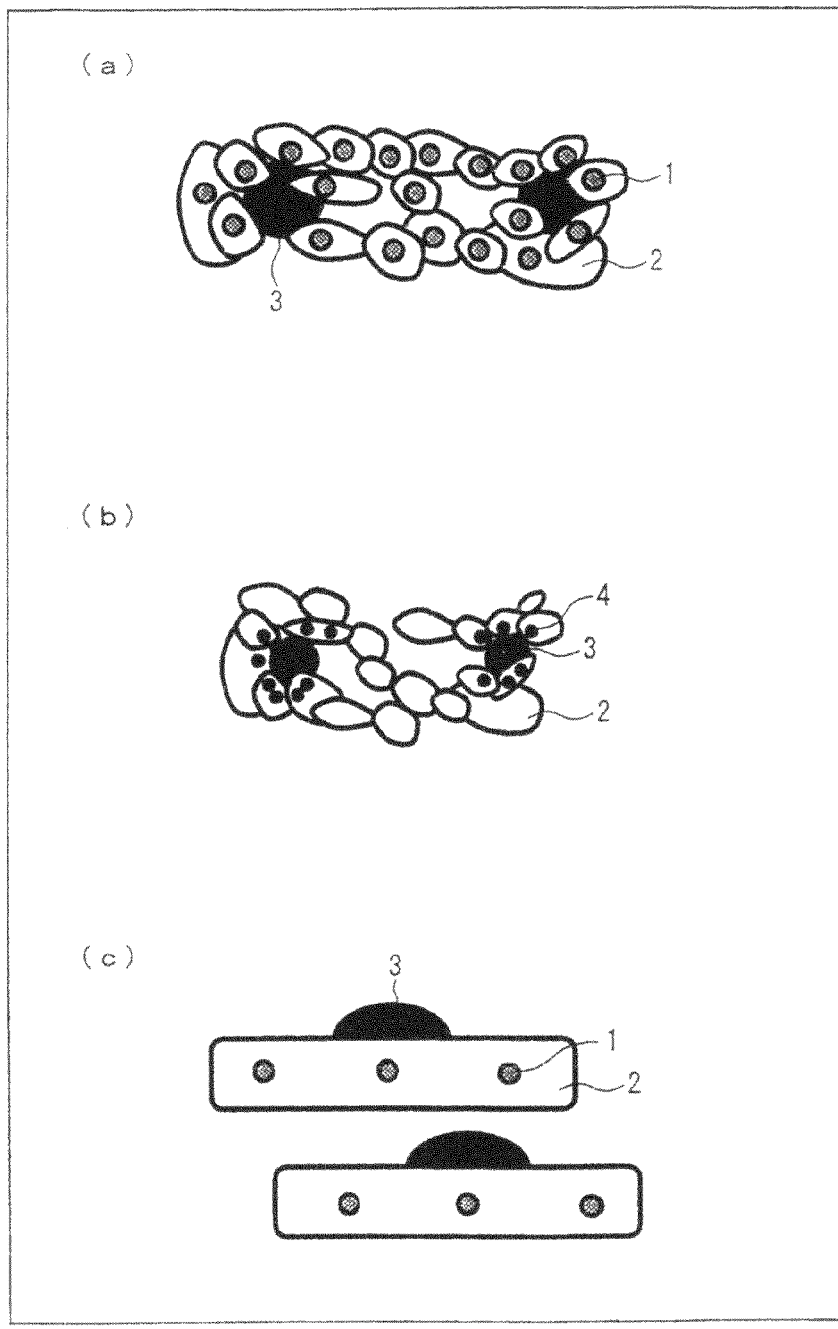
FIG. 2 is a plan view schematically illustrating catalysts each of which has been subjected to the durability process.

FIG. 2 is a plan view schematically illustrating the catalysts which have been subjected to the durability process. Materials identical with those in FIG. 1 have the same signs as those in FIG. 1. Further, in each of (a) through (c) of FIG. 2, a plurality of materials which are identical with each other are indicated such that only one of the plurality of identical materials is pointed with a corresponding sign, in the same manner as FIG. 1.

As described above, it has been known that rhodium is mixed in alumina and forms the solid solution in combination with alumina, when the catalyst is exposed to the oxygen-excess atmosphere having a high temperature. In addition, it has been known that in a case where the catalyst is exposed to a reducing atmosphere, rhodium 4 which has been mixed in alumina and has formed the solid solution in combination with alumina is separated out of alumina on the surface of alumina (see (b) of FIG. 2). The separated rhodium is dispersed in a form of clusters.

Note that (a) of FIG. 2 is a plan view schematically illustrating how lanthanum-containing alumina is supported while being adjacent to the rhodium particles, in a similar manner to (a) of FIG. 1.

Rhodium that has been mixed in alumina and has formed the solid solution in combination with alumina can be detected by various methods. In the present specification, rhodium is detected by an X-ray photoelectric spectroscopy method (XPS) and a CO pulse adsorption method.

An $Rh3d_{5/2}$ peak of rhodium that has been mixed in alumina and has formed the solid solution in combination with alumina can be detected at approximately 310.2 eV. The peak belonging to rhodium that has been mixed in alumina and has formed the solid solution in combination with alumina, a peak belonging to nonvalent rhodium, detected at 307.2 eV, and a peak belonging to trivalent rhodium, detected at an eV in a range of 308.2 eV to 308.9 eV, are separated out independently so that an area of each of the peaks with respect to the background can be found.

The larger a proportion of such rhodium is, the clearer the peak becomes. In a case where the proportion of such rhodium is small, the observed peak may look like a shoulder peak. Regardless of whether or not the peak is clear, it is possible to find the proportion of corresponding rhodium by separating out the peak.

On the basis of area ratios of nonvalent rhodium, trivalent rhodium, and rhodium that has been mixed in alumina and has formed the solid solution in combination with alumina, a ratio of surface atoms (Atomic %, hereinafter, referred to as "At %") of each rhodium with respect to a total of surface atoms of the entire rhodium can be found by use of the following Formula (1). The atom ratio of rhodium (Rh) that has been mixed in alumina and has formed the solid solution in combination with alumina can be also found in a similar manner.

[Formula 1]

$$\text{Atom ratio of Rh mixed in alumina } (At \%) = \frac{\text{Area of peak of Rh mixed in alumina}}{\text{Total area of peaks of nonvalent Rh, trivalent Rh, and Rh mixed in alumina}} \times 100 \quad (1)$$

In one embodiment of the exhaust gas purification catalyst of the present invention, rhodium that has been mixed in alumina and has formed a solid solution in combination with alumina preferably has an atom ratio in a range of 0% to 20%, more preferably in a range of 0% to 12%, with respect to a total of atoms of the entire rhodium, after the exhaust gas purification catalyst is exposed to an oxygen-excess gas having a temperature in a range of 950° C. to 1000° C.

As described above, the rhodium particles that have been mixed in alumina and have formed a solid solution in combination with alumina are separated out on the surface of alumina in the form of clusters under the reducing atmosphere. When the catalyst is subjected to a hydrogen reduction process by the CO pulse adsorption method or the like, rhodium that has been mixed in alumina and has formed a solid solution in combination with alumina is separated out on the surface of alumina in the form of clusters. This increases a CO adsorption amount of the catalyst.

Generally, the high-temperature durability process accelerates the sintering of the precious metal supported on the carrier. For this reason, it is considered that the CO adsorption amount, measured by the CO pulse method after the durability process, becomes less than the amount, measured before the durability process.

However, in a case where the catalyst in which rhodium has been mixed in alumina and has formed the solid solution is subjected to the durability process at a high temperature under the presence of an oxygen-excess atmosphere, the CO adsorption amount, measured by the CO pulse adsorption method after the durability process, becomes greater than the amount, measured before the durability process.

It is considered that such increase in CO adsorption amount is caused because the rhodium particles that has been mixed in alumina and has formed the solid solution in combination with alumina are separated out on the surface of alumina in the form of clusters due to the reduction process of the CO pulse adsorption method. It is thus possible to obtain, by use of the CO pulse adsorption method, collateral evidence data indicating that there is rhodium that has been mixed in alumina and has formed a solid solution in combination with alumina.

In the present specification, the description "a case where there is rhodium that has been mixed in alumina and has formed a solid solution in combination with alumina" means a case that satisfies the following conditions: (1) the atom ratio of rhodium that has been mixed in alumina and has formed a solid solution in combination with alumina has a positive value; and (2) the exposed surface area of rhodium, measured by the CO pulse adsorption method after the durability process, is greater than that of rhodium, measured before the durability process.

In other words, the foregoing case is a case where a reduction rate of the exposed surface area of the precious metal (rhodium) has a negative value, which reduction rate is defined by the following Formula (2).

[Formula 2]

$$\text{Reduction rate of exposed surface area of precious metal } [\%] = \frac{\text{Exposed surface area of precious metal before durability process} - \text{Exposed surface area of precious metal after durability process}}{\text{Exposed surface area of precious metal before durability process}} \times 100 \quad (2)$$

Note that the "exposed surface area of the precious metal" is a value obtained by use of a formula of "the number of CO molecules adsorbed to 1 g of the exhaust gas purification catalyst"×"(lattice constant of the precious metal)$^2$". Further, the "number of CO molecules" can be found by the CO pulse adsorption method (see Reference Document: Catalyst, 1986, vol. 28, No. 1). For example, a lattice constant of rhodium (precious metal) is 3.8030.

The "exposed surface area of the precious metal" can be measured in accordance with the CO pulse adsorption method (see Reference Document: Catalyst, 1986, vol. 28, No. 1), which was proposed by the Committee on Reference Catalyst of the Catalysis Society of Japan.

Generally, the high-temperature durability process develops the sintering of the precious metal that has been supported on the carrier. Therefore, it is considered that the CO adsorption amount, measured by the CO pulse adsorption method after the durability process, is less than the amount, measured before the durability process.

In a case where the reduction rate of the exposed surface area of the precious metal is less than 0%, it is believed that the exposed surface area of the precious metal was increased through the high-temperature durability process. This is not preferable because, in such a case, it is considered that the coating structure in the catalyst is broken due to: the formation of the solid solution of the precious metal and alumina; heat contraction of alumina coating the precious metal, caused through the durability process; or the like. On the other hand, it is also not preferable that the reduction rate of the exposed surface area of the precious metal is greater than 87%. This is because, in such a case, it is highly possible that the sintering of the precious metal particles is significantly developed through the durability process so that the number of the precious metal atoms that contribute to the catalyst reaction is reduced.

In the exhaust gas purification catalyst of the present embodiment, it is preferable that (i) the exposed surface area of the precious metal is reduced or unchanged in a case where the exhaust gas purification catalyst is exposed to an oxygen-excess gas having a temperature in a range of 950° C. to 1000° C. Further, in view of an effect of inhibiting the sintering of the precious metal particles (such as rhodium particles), the reduction rate of the exposed surface area is preferably in a range of 0% to 80%, more preferably in a range of 0% to 65%.

<Catalyst Containing Precious Metal-Cerium Oxide Complex Coated with Lanthanum-Containing Alumina>

In the exhaust gas purification catalyst of the present embodiment, a complex made of a precious metal and a cerium oxide is preferably coated with lanthanum-containing alumina. That is, it is preferable that the exhaust gas purification catalyst of the present embodiment contains a precious metal-cerium oxide complex (hereinafter, merely referred to as "complex", in some cases) coated with lanthanum-containing alumina.

With this structure, in addition to the foregoing advantages of (i) the increase in heat resistance and (ii) the inhibition of the sintering, it becomes possible to have an increase in oxygen absorption. The increase in oxygen absorption allows the catalyst to have a higher catalyst capability.

Figure 3:
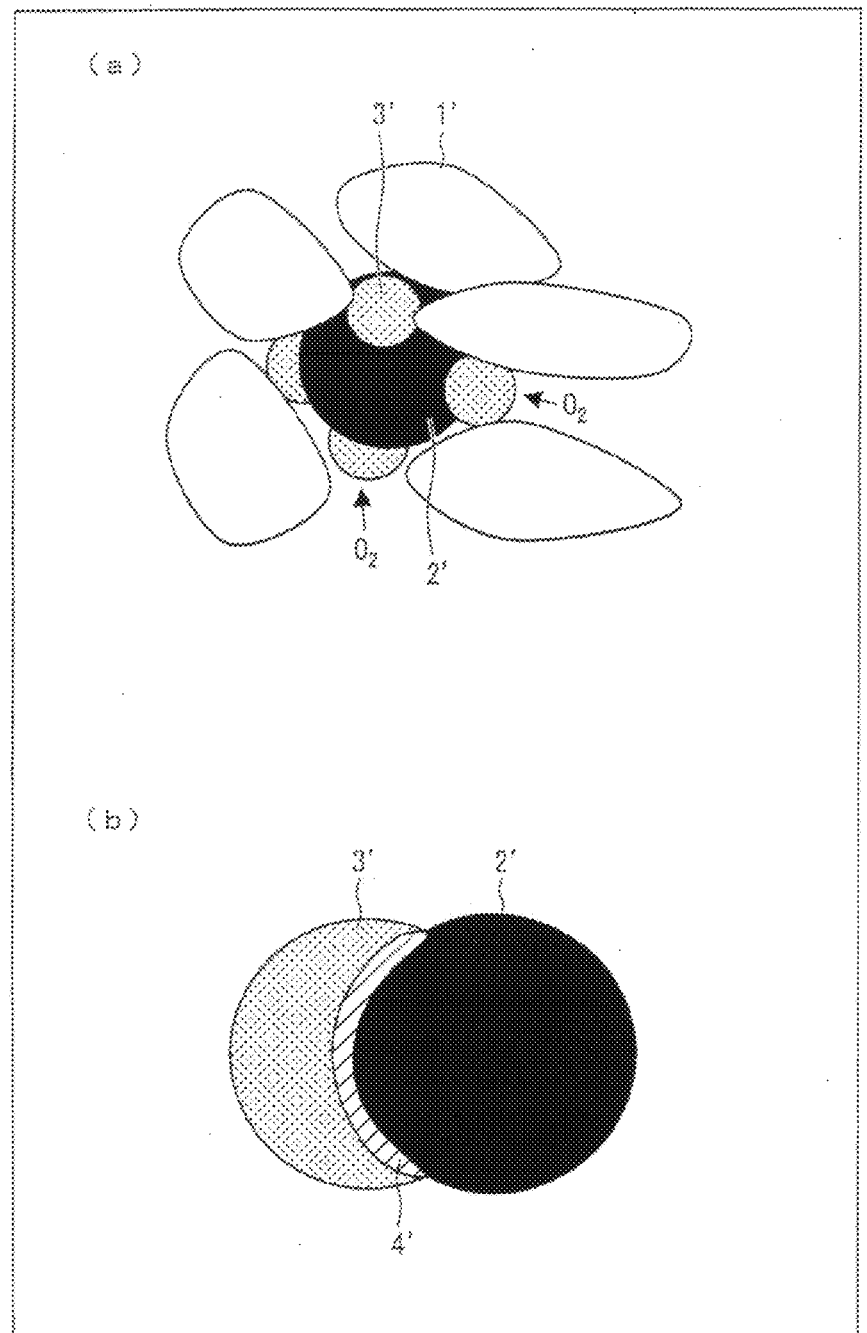
FIG. 3 is a plan view schematically illustrating a state of an exhaust gas purification catalyst in accordance with an embodiment of the present invention: (a) of FIG. 3 illustrates a state of the exhaust gas purification catalyst which has not been subjected to a high-temperature durability process; and (b) of FIG. 3 illustrates a state of an interface between a precious metal and a cerium oxide.

The following description deals with the state where the complex made of precious metal particles and cerium oxide particles is coated with lanthanum-containing alumina, with reference to (a) of FIG. 3.

(a) of FIG. 3 is a plan view schematically illustrating the state of the exhaust gas purification catalyst of the present embodiment before the catalyst is subjected to the high-temperature durability process.

Lanthanum-containing alumina 1' is supported while being adjacent to a complex made of a precious metal 2' and a cerium oxide 3' (see (a) of FIG. 3).

The wording "while being adjacent to a complex" means that lanthanum-containing alumina 1' is partially in contact with the precious metal 2' and/or the cerium oxide 3'. In this state, a molecule (such as oxygen ($O_2$) or carbon monoxide (CO)), which generally can be adsorbed to the precious metal 2' or the cerium oxide 3', cannot be adsorbed to the precious metal 2' or the cerium oxide 3' at the interface between lanthanum-containing alumina 1' and the precious metal 2' and/or the cerium oxide 3'.

Figure 4:
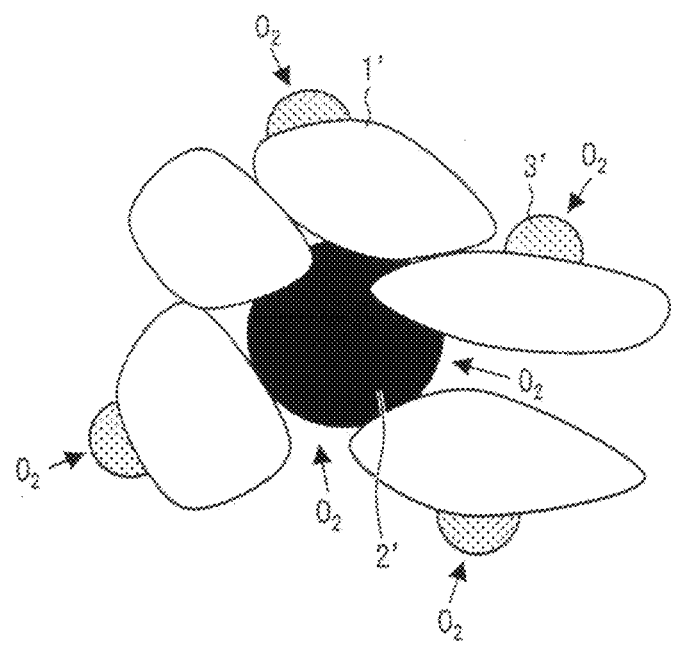
FIG. 4 is a plan view schematically illustrating a catalyst in which (i) the precious metal is coated with lanthanum-containing alumina, and (ii) the cerium oxide is supported but not adjacent to the precious metal.

Note that in the structured illustrated in FIGS. 3 and 4, it is preferable that (i) lanthanum-containing alumina 1' is particles of lanthanum-containing alumina, (ii) the precious metal 2' is particles of the precious metal, and (iii) the cerium oxide 3' is particles of the cerium oxide.

As described above, it is preferable that lanthanum-containing alumina, the precious metal, and the cerium oxide are in the form of particles. In this case, lanthanum-containing alumina and the cerium oxide may be in a form of either primary particles or secondary particles, but it is preferable that lanthanum-containing alumina and the cerium oxide are in the form of the secondary particles into which the primary particles aggregate together. Further, it is preferable that each of lanthanum-containing alumina and the cerium oxide has an average particle diameter in a range of 0.5 µm to 150 µm, more preferably in a range of 1 µm to 50 µm, before a slurry is made from these.

The following description deals with the "complex made of the precious metal and the cerium oxide" with reference to (a) and (b) of FIG. 3.

As illustrated in (a) of FIG. 3, the "complex made of the precious metal and the cerium oxide" is a complex in which 1 or more atoms of the precious metal 2' and 1 or more atoms of the cerium oxide 3' are partially in contact with each other. The examples of the complex encompass: a solid solution of the precious metal and the cerium oxide; a mixture of the precious metal and the cerium oxide (or cerium); a compound of the precious metal and cerium; or any combination of two or more foregoing materials.

In the complex made of the precious metal particles and the cerium oxide particles, the cerium oxide 3' exists adjacent to the precious metal 2'. Therefore, it is believed that in a case where the oxygen-excess gas flows into the complex, the cerium oxide 3' occludes oxygen. This eases the oxygen-excess state of a gas in the vicinity of the precious metal 2'.

On the other hand, under the reducing atmosphere in which an amount of oxygen is insufficient, oxygen that has been occluded by the cerium oxide 3' can be used by the precious metal 2' effectively because such oxygen exists adjacent to the precious metal 2'.

(b) of FIG. 3 is a plan view schematically illustrating a state of the interface between the precious metal 2' and the cerium oxide 3'.

As illustrated in (b) of FIG. 3, a compound 4' made of the precious metal 2' and the cerium oxide 3' is formed at the interface in the complex made of the precious metal 2' and the cerium oxide 3'. The formation of the compound 4' can be confirmed by causing the "precious metal-cerium oxide complex coated with lanthanum-containing alumina" to be subjected to X-ray diffraction. Note that the presence of such a compound can be confirmed before/after the high-temperature durability process (later described in detail).

Meanwhile, FIG. 4 is a plan view schematically illustrating a state where (i) the precious metal 2' is coated with lanthanum-containing alumina 1', and (ii) the cerium oxide 3' is supported but not adjacent to the precious metal 2'.

Such a structure is different from the exhaust gas purification catalyst of the present embodiment in that since the cerium oxide 3' is supported but not adjacent to the precious metal 2', the presence of the compound made of the precious metal 2' and the cerium oxide 3' cannot be confirmed by the X-ray diffraction analysis before/after the high-temperature durability process. Further, in such a structure, since the cerium oxide 3' is supported but not adjacent to the precious metal 2', the cerium oxide 3' occludes oxygen but excess oxygen are left in the vicinity of the precious metal 2' when the oxygen-excess gas flows into the catalyst.

On the other hand, under the reducing atmosphere in which the amount of oxygen is not sufficient, the cerium oxide 3' releases oxygen that has been occluded under the oxygen-excess atmosphere, but such oxygen is not released in the vicinity of the precious metal 2'. Therefore, such oxygen cannot be used by the precious metal 2' effectively.

Figure 5:
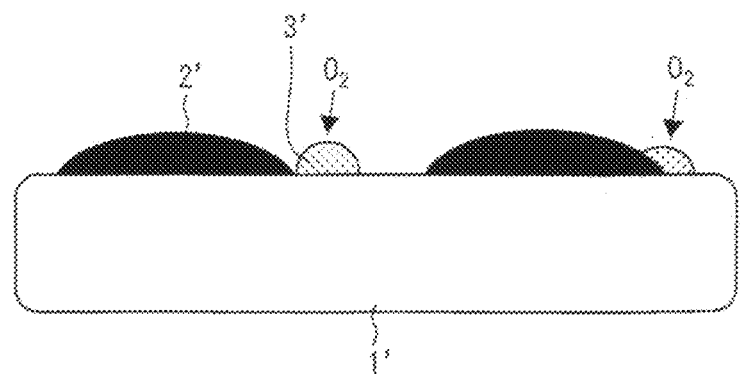
FIG. 5 is a plan view schematically illustrating how a precious metal and alumina are supported in a conventional exhaust gas purification catalyst which is produced by an impregnation method.

FIG. 5 is a plan view schematically illustrating how the precious metal 2' is supported on alumina 1' in a conventional exhaust gas purification catalyst which is produced by an impregnation method.

In the state illustrated in FIG. 5, a large part of the particles of the precious metal 2' is supported on a surface of a carrier. In the state illustrated in FIG. 5, the peak belonging to the cerium oxide is detected more clearly by the X-ray diffraction analysis before/after the high-temperature durability process. Therefore, the peak of the compound made of the precious metal and the cerium oxide can be hardly detected.

Further, since the cerium oxide 3' is supported while being relatively in the vicinity of the precious metal 2', it is possible that (i) the cerium oxide 3' absorbs oxygen existing in the vicinity of the precious metal 2' under the oxygen-excess atmosphere, and (ii) the precious metal 2' uses oxygen released from the cerium oxide 3' under the reducing atmosphere. However, the precious metal 2' is not coated with alumina (unlike the structures illustrated in (a) of FIG. 3, and FIG. 4) so that the sintering of the precious metal 2' is likely to occur. It is not preferable that the sintering of the precious metal particles (serving as a catalyst constituent) occurs, because such sintering reduces the surface area of the precious metal particles, and therefore reduces the catalyst activity.

It is preferable that the exhaust gas purification catalyst keeps containing the complex coated with lanthanum-containing alumina, even after the catalyst is exposed to an exhaust gas having a temperature in a range of 800° C. to 1000° C. (more preferably in a range of 950° C. to 1000° C.), the exhaust gas being emitted from the internal-combustion engine.

That is, in this case, even if the catalyst is exposed to the gas having a temperature equal to the highest catalyst bed temperature, (i) the sintering of the precious metal is inhibited, and (ii) oxygen is occluded/released by the cerium oxide in the vicinity of the precious metal particles. That is, a fluctuation in air-fuel ratio is eased in the vicinity of the precious metal. Therefore, it becomes possible to cause the precious metal to efficiently function as the exhaust gas purification catalyst even after the catalyst is exposed to the high-temperature durability process.

In view of the inhibition of the sintering of the precious metal particles, it is preferable, in the exhaust gas purification catalyst, that in a case where the exhaust gas purification catalyst is exposed to an exhaust gas having a temperature in a range of 800° C. to 1000° C., the exhaust gas being emitted from a vehicle employing a gasoline engine, an exposed surface area of the precious metal is reduced by a percentage in a range of 0% to 87%, more preferably in a range of 0% to 40%, with respect to an exposed surface area of the precious metal before the exposure.

Further, it is preferable that in a case where the exhaust gas purification catalyst is exposed to an exhaust gas having a temperature in a range of 950° C. to 1000° C., the exhaust gas being emitted from the vehicle having the gasoline engine, the exposed surface area of the precious metal is reduced by a percentage in a range of 0% to 87%, more preferably in a range of 0% to 40%, with respect to an exposed surface area of the precious metal before the exposure.

Note that the reduction rate of the exposed surface area of the precious metal can be defined by the Formula (2) as described above.

How to expose the exhaust gas purification catalyst to the foregoing gas is not particularly limited, and may be identical with the method described in the foregoing <Catalyst containing precious metal coated with lanthanum-containing alumina>. Further, the foregoing gas and the internal-combustion engine may be selected from the foregoing examples.

(ii) Each Component Constituting Exhaust Gas Purification Catalyst

The exhaust gas purification catalyst of the present embodiment may contain only the precious metal coated with lanthanum-containing alumina or the complex made of the precious metal and the cerium oxide, coated with lanthanum-containing alumina. Alternatively, the exhaust gas purification catalyst of the present embodiment may contain the precious metal coated with lanthanum-containing alumina or the complex coated with lanthanum-containing alumina, and another component(s).

The following description deals with each of components constituting the exhaust gas purification catalyst of the present embodiment.

(Lanthanum-Containing Alumina)

The "lanthanum-containing alumina" is not particularly limited, provided that lanthanum and alumina are mixed with each other. Lanthanum-containing alumina may be a mixture of (i) alumina and (ii) a lanthanum oxide ($La_2O_3$) and a lanthanum-alumina composite oxide ($LaAlO_3$ or the like), for example.

It is preferable that lanthanum is contained in the form of the lanthanum oxide ($La_2O_3$) and/or in the form of the lanthanum-alumina composite oxide ($LaAlO_3$ or the like). It is more preferable that lanthanum is contained in the form of the lanthanum oxide ($La_2O_3$). Further, it is more preferable that the "lanthanum-containing alumina" contains both the lanthanum oxide and the lanthanum-alumina composite oxide.

It is preferable that the "lanthanum-containing alumina" contains lanthanum in an amount (in terms of $La_2O_3$) in a range of 0.5% by mass to 30% by mass, more preferably in a range of 2% by mass to 20% by mass, with respect to a total amount of lanthanum and alumina (in terms of $Al_2O_3$).

The reason why the foregoing range is preferable is described below: (1) In a case where lanthanum is contained in an amount of not less than 0.5% by mass, the precious metal becomes not likely to (i) be mixed in alumina and therefore (ii) form a solid solution in combination with alumina, after the high-temperature durability process. (2) In a case where lanthanum is contained in an amount not more than 30% by mass, a proportion of lanthanum which has a smaller surface area than that of alumina would not become too large, and dispersibility of another catalyst and/or a promoter component is hardly reduced.

(Precious Metal)

The precious metal is not particularly limited, provided that the precious metal has catalyst activity. Examples of the precious metal encompass: gold; silver; platinum; ruthenium; rhodium; palladium; osmium; iridium; and any combination of two or more of these. Among these, it is more preferable to use rhodium, palladium, or platinum, as the precious metal because they have a high three-way catalytic capability. Further, it is furthermore preferable to use rhodium or palladium, as the precious metal because they have a high purification rate against a nitrogen oxide and a hydrocarbon. It is most preferable to use rhodium as the precious metal.

It is preferable that the precious metal is contained in an amount (in terms of the precious metal) in a range of 0.2% by mass to 20% by mass, more preferably in a range of 0.5% by mass to 5% by mass, with respect to an amount of lanthanum-containing alumina. The reason why the foregoing range is preferable is described below: (1) In a case where the amount of the precious metal thus contained is not less than 0.2% by mass, a ratio of the precious metal that is coated with lanthanum-containing alumina is not likely to be too high. Accordingly, the amount of the precious metal particles exposed to the gas phase would not become too small. This can prevent a reduction in catalyst capability of the exhaust gas purification catalyst. (2) On the other hand, in a case where the amount of the precious metal thus contained is not more than 20% by mass, the ratio of the precious metal particles that have not been coated with lanthanum-containing alumina becomes small.

(Cerium Oxide)

In the exhaust gas purification catalyst of the present embodiment, it is preferable that an amount of the cerium oxide (in terms of $CeO_2$) contained in the complex is in a range of 1% by mass to 40% by mass, more preferably in a range of 1% by mass to 30% by mass, furthermore preferably in a range of 5% by mass to 30% by mass, still further preferably 5% by mass to 20% by mass, with respect to the total amount of the precious metal (in terms of the metal), the cerium oxide, lanthanum (in terms of lanthanum), and alumina (in terms of $Al_2O_3$). The reason why the foregoing range is preferable is described below: (1) In a case where the amount of the cerium oxide contained in the complex is not less than 1% by mass, a fluctuation in air-fuel ratio is eased in the vicinity of the precious metal which serves as the catalyst activity constituent. (2) In a case where the amount of the cerium oxide contained in the complex is not more than 30% by mass, an exhaust gas is likely to be contact with the precious metal.

In the exhaust gas purification catalyst of the present embodiment, it is preferable that an amount of the cerium oxide thus contained is greater than an amount of the compound made of the precious metal and the cerium oxide in the complex made of the precious metal and the cerium oxide.

Note, here, that the comparison of the "amounts" can be carried out in such a manner that peak intensities, measured by the X-ray diffraction analysis, are compared with each other. Accordingly, in a case where, for example, the exhaust gas purification catalyst of the present embodiment employs rhodium as the precious metal, it is preferable that (i) a peak intensity at a diffraction angle indicating a maximum intensity of $CeO_2$ (28.5547° (±) 0.017°) is found, and (ii) a peak intensity at a diffraction angle indicating a maximum intensity of CeRh (32.7652° (±)) 0.017° is found, and (iii) the peak intensity at 28.5547° (±) 0.017°, belonging to $CeO_2$, is higher than the peak intensity at 32.7652° (±0.017°), belonging to CeRh.

Further, in a case where a material having a diffraction angle near from the diffraction angle belonging to $CeO_2$ and the diffraction angle belonging to CeRh is contained in the exhaust gas purification catalyst, (i) the peak belonging to the material may be separated from the peak belonging to $CeO_2$ and the peak belonging to CeRh, and then (ii) the peak intensities of $CeO_2$ and CeRh may be found.

In accordance with the amount of the cerium oxide contained in the exhaust gas purification catalyst, there is a fluctuation in ratio of the amount of the cerium oxide contained in the complex, with respect to the amount of the compound made of the precious metal and the cerium oxide, contained in the complex. However, in a case where the amount of the cerium oxide contained in the complex is within the foregoing range of 1% by mass to 40% by mass (preferably in a range of 1% by mass to 30% by mass), the amount of the cerium oxide contained in the complex would be greater than the amount of the compound contained in the complex. This allows the cerium oxide to sufficiently function as the oxygen occlusion/release material so that a fluctuation in air-fuel ratio is suitably eased in the vicinity of the precious metal. The foregoing range for the amount of the cerium oxide contained in the complex is thus preferable.

In one embodiment of the present invention, in a case where the precious metal is rhodium, the compound is CeRh. It is preferable that the intensity of the peak belonging to the cerium oxide with respect to the intensity of the peak belonging to CeRh (hereinafter, referred to as "$CeO_2$/CeRh") is not less than 1.0 but less than 3.3, the intensities being found by the X-ray diffraction analysis. In a case where the "$CeO_2$/CeRh" is within the foregoing range, the exhaust gas purification catalyst contains (i) the cerium oxide having the oxygen occlusion/release ability and (ii) CeRh. That is, the cerium oxide is supported while being adjacent to rhodium. This allows the cerium oxide to effectively exhibit its oxygen occlusion/release ability.

(Fire-Resistant Inorganic Oxide)

The exhaust gas purification catalyst of the present embodiment preferably further contains a fire-resistant inorganic oxide. It is preferable that a melting point of the fire-resistant inorganic oxide is not less than 1000° C.

The fire-resistant inorganic oxide is not particularly limited, provided that it can be generally used as a catalyst carrier for an exhaust gas. Examples of the fire-resistant inorganic oxide encompass: γ alumina ($Al_2O_3$), silica ($SiO_2$), silica-alumina ($SiO_2$—$Al_2O_3$), titania ($TiO_2$), magnesia (MgO), zeolite, a ceria-zirconia composite oxide, and zirconia. Among these, the catalyst preferably contains at least one of alumina, the ceria-zirconia composite oxide, zirconia, and magnesia.

Note that the "ceria-zirconia composite oxide" is a composite oxide in which zirconia is mixed in ceria and forms a solid solution in combination with ceria. The "ceria-zirconia composite oxide" may also contain at least one of lanthanum, yttrium, and praseodymium, for example.

It is preferable that (i) a mass ratio of ceria to zirconia in the ceria-zirconia composite oxide is in a range of 90:10 to 10:90, and (ii) the amount of another component(s) contained in the ceria-zirconia composite oxide is not more than 20% by mass per ceria-zirconia composite oxide. The ceria-zirconia composite oxide can be prepared by a coprecipitation method (Reference Document: Dictionary of Catalyst, Page 194, Asakura Shoten), for example.

The fire-resistant inorganic oxide may further contain an oxide of a transition metal (such as iron, nickel, cobalt, and manganese), an oxide of an alkali metal, an oxide of an alkali earth metal, or an oxide of a rare earth element (such as lanthanum).

Further, the fire-resistant inorganic oxide may be coated with lanthanum-containing alumina or may not be coated with lanthanum-containing alumina. Here, it is preferable that the ceria-zirconia composite oxide is not coated with lanthanum-containing alumina. This makes it possible to purify an exhaust gas more efficiently.

Note that the description of "not coated with lanthanum-containing alumina" means that the corresponding material does not exist at the interface between the precious metal and alumina. That is, the state where "the ceria-zirconia composite oxide is not coated with lanthanum-containing alumina" is the state where "the ceria-zirconia composite oxide does not exist between the precious metal and alumina", for example.

In a case where the exhaust gas purification catalyst is not supported on a three-dimensional structure (later described in detail), it is preferable that an amount of the fire-resistant inorganic oxide contained in the catalyst is in a range of 5% by mass to 80% by mass, more preferably in a range of 10% by mass to 60% by mass, with respect to the total mass of the catalyst.

In a case where the fire-resistant inorganic oxide is supported on the three-dimensional structure (later described in detail), it is preferable that the amount of the fire-resistant inorganic oxide contained in the catalyst is, per liter of the three-dimensional structure, in a range of 30 g to 300 g, more preferably in a range of 70 g to 150 g. It is preferable that the amount of the ceria-zirconia composite oxide that is not coated with lanthanum-containing alumina, contained in the catalyst, is, per liter of the three-dimensional structure, in a range of 5 g to 100 g, more preferably in a range of 20 g to 80 g.

(Other Components)

The exhaust gas purification catalyst of the present embodiment preferably further contains a cerium oxide that is not coated with lanthanum-containing alumina. This eases a fluctuation in the atmosphere in the vicinity of the precious metal that is not coated with alumina. Accordingly, it becomes possible to purify an exhaust gas furthermore efficiently.

In a case where the exhaust gas purification catalyst of the present embodiment is supported on the three-dimensional structure, it is preferable that an amount of the cerium oxide that is not coated with lanthanum-containing alumina, contained in the catalyst, is, per liter of the three-dimensional structure, in a range of 5 g to 100 g, more preferably in a range of 20 g to 80 g.

In a case where the exhaust gas purification catalyst is not supported on the three-dimensional structure, it is preferable that the amount of the cerium oxide that is not coated with lanthanum-containing alumina, contained in the catalyst, is in a range of 5% by mass to 80% by mass, more preferably in a range of 10% by mass to 60% by mass, with respect to the total mass of the catalyst.

The exhaust gas purification catalyst of the present embodiment may further contain rhodium, palladium, and/or platinum, each of which is not coated with lanthanum-containing alumina.

In a case where the exhaust gas purification catalyst of the present embodiment is supported on the three-dimensional structure (later described in detail), it is preferable that an amount of platinum that is not coated with lanthanum-containing alumina, contained in the catalyst, is, per liter of the three-dimensional structure, in a range of 0.1 g to 5 g, more preferably in a range of 0.5 g to 1 g. The reason why the foregoing range is preferable is described below: (1) In a case where the amount of platinum contained in the catalyst is not less than 0.1 g per liter of the three-dimensional structure, the catalyst exhibits a superior catalyst capability. (2) In a case where the amount of platinum contained in the catalyst is not more than 5 g per liter of the three-dimensional structure, a high contributing ratio of the amount of platinum to the catalyst capability can be obtained, i.e. a high cost-performance ratio can be obtained.

Further, in the case where the exhaust gas purification catalyst of the present embodiment is supported on the three-dimensional structure (later described in detail), it is preferable that an amount of palladium that is not coated with lanthanum-containing alumina, contained in the catalyst, is, per liter of the three-dimensional structure, in a range of 0.5 g to 10 g, more preferably in a range of 1 g to 8 g. The reason why the foregoing range is preferable is described below: (1) In a case where the amount of palladium contained in the catalyst is not less than 0.5 g per liter of the three-dimensional structure, the catalyst exhibits a superior catalyst capability. (2) In a case where the amount of palladium contained in the catalyst is not more than 10 g per liter of the three-dimensional structure, a high contributing ratio of the amount of palladium to the catalyst capability can be obtained, i.e. a high cost-performance ratio can be obtained.

(ii) Three-Dimensional Structure

The exhaust gas purification catalyst of the present embodiment is preferably supported on the three-dimensional structure. That is, in the exhaust gas purification catalyst of the present embodiment, it is preferable that each of the components described above is supported on the three-dimensional structure.

The three-dimensional structure is not particularly limited, and may be a heat-resistant carrier such as a honeycomb carrier, for example. Further, it is preferable to use an integral mold-type three-dimensional structure (integral structure) as the three-dimensional structure. Examples of the integral structure encompass: a monolith carrier; a metal honeycomb carrier; a plugged honeycomb carrier such as a diesel particulate filter; and a perforated metal. Note that the three-dimensional structure is not necessarily a three-dimensional integral structure, and may be a pellet carrier or the like, for example.

The monolith carrier is not particularly limited provided that the monolith carrier is the one called "ceramic honeycomb carrier". It is preferable that the monolith carrier is made from cordierite, mullite, α-alumina, a silicon carbide, a silicon nitride, or the like. It is particularly preferable that the monolith carrier is made from cordierite. Other than these, it is possible to use as the three-dimensional structure, an integral structure made from a heat-resistant metal which (i) has a resistance against oxidation, and (ii) contains a stainless steel, an Fe—Cr—Al alloy, or the like.

Each of these monolith carriers is produced by an extrusion molding method, a method of winding and hardening a sheet element, or the like. The monolith carrier has a gas vent (cell shape) whose shape may be any one of a hexagonal shape, a quadrangular shape, a triangular shape, and a corrugation shape. The monolith carrier having a cell density (the number of cells/unit cross-sectional area) in a range of 100 cells to 1200 cells/square inch can be suitable used. It is preferable that the monolith carrier has a cell density in a range of 200 cells to 900 cells/square inch.

In a case where the exhaust gas purification catalyst of the present embodiment is supported on the three-dimensional structure, it is preferable that an amount of the precious metal contained in the exhaust gas purification catalyst is, per liter of the three-dimensional structure, in a range of 0.01 g to 10 g, more preferably in a range of 0.01 g to 5 g, furthermore preferably in a range of 0.01 g to 3 g, still more preferably in a range of 0.01 g to 1.5 g. Note that how to support the catalyst on the three-dimensional structure is not particularly limited. The catalyst can be supported on the three-dimensional structure by a method such as a washcoat method.

The reason why the foregoing range is preferable is described below: (1) In a case where the amount of the precious metal contained in the catalyst is not less than 0.01 g per liter of the three-dimensional structure, the catalyst exhibits a high catalyst capability. (2) In a case where the amount of the precious metal contained in the catalyst is not more than 5 g per liter of the three-dimensional structure, a high contributing ratio of the amount of the precious metal to the catalyst capability can be obtained, i.e. a high cost-performance ratio can be obtained.

Further, it is preferable that an amount of the complex contained in the exhaust gas purification catalyst is, per liter of the three dimensional structure, in a range of 30 g to 300 g, more preferably in a range of 70 g to 150 g, which complex (i) is made of the precious metal and the cerium oxide and (ii) is, at least partially, coated with lanthanum-containing alumina (powder obtained by coating the complex made of the precious metal and the cerium oxide with lanthanum-containing alumina). Further, in a case where the exhaust gas purification catalyst of the present embodiment is supported on the three-dimensional structure, it is preferable that an amount of the fire-resistant inorganic oxide contained in the exhaust gas purification catalyst is, per liter of the three-dimensional structure, in a range of 30 g to 300 g, more preferably in a range of 70 g to 150 g.

(iii) Property of Exhaust Gas Purification Catalyst (Pore Volume of Pores)

In the exhaust gas purification catalyst of the present embodiment, it is preferable that a pore volume of pores of not less than 160 nm but less than 1000 nm in diameter accounts for 5% to 20% in a total porous volume of the exhaust gas purification catalyst. It is more preferable that the pore volume of the pores of not less than 160 nm but less than 800 nm in diameter accounts for not less than 5% but less than 18% in the total pore volume. It is furthermore preferable that a pore volume of pores of not less than 160 nm but less than 600 nm in diameter accounts for not less than 5% but less than 16% in the total pore volume.

Further, it is preferable that a pore volume of pores of less than 160 nm in diameter accounts for, in the total pore volume of the exhaust gas purification catalyst, 70% to 90%, more preferably 72% to 90%, furthermore preferably 77% to 89%.

Figure 6:
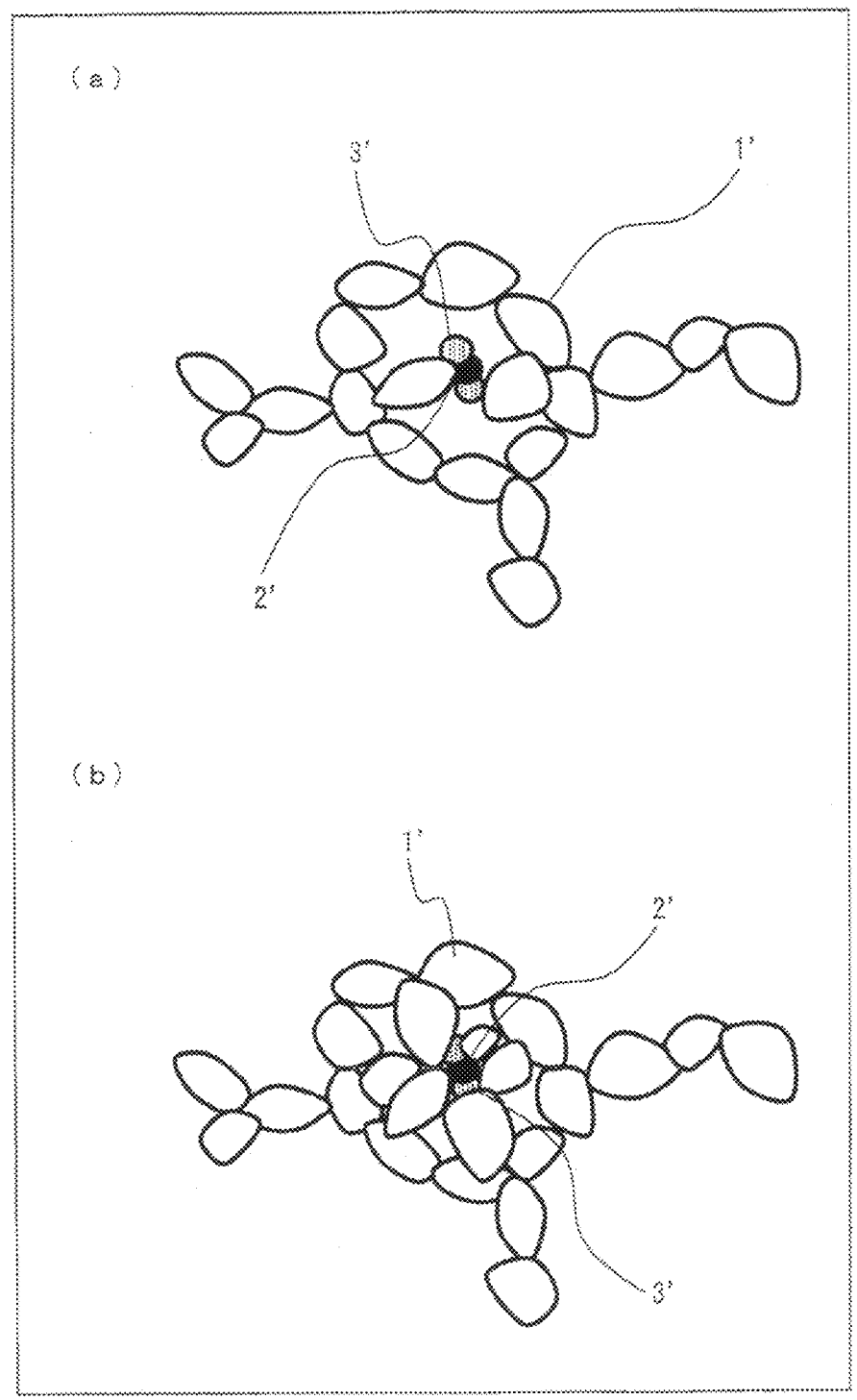
FIG. 6 is a plan view schematically illustrating each pore size distribution in which lanthanum-containing alumina is supported while being adjacent to the cerium oxide and the precious metal.

(a) of FIG. 6 is a plan view schematically illustrating a structure in which lanthanum-containing alumina 1' is supported while being adjacent to the cerium oxide 3' and the precious metal 2', where the pore volume of the pores of not less than 160 nm but less than 1000 nm in diameter accounts for 5% to 20% in the total pore volume, and the pore volume of the pores of less than 160 nm in diameter accounts for 70% to 90% in the total pore volume, which pore volumes are measured by a mercury penetration method.

In the catalyst having the pore size distribution illustrated in (a) of FIG. 6, both the precious metal 2' and the cerium oxide 3' are coated with lanthanum-containing alumina 1', but the exhaust gas is likely to be adsorbed to both the precious metal 2' and the cerium oxide 3'. Therefore, it is believed that (i) the sintering of the precious metal 2' can be inhibited even after the durability process, and (ii) purification reaction of the exhaust gas is likely to occur.

Further, in the state illustrated in (a) of FIG. 6, the cerium oxide 3' exists adjacent to the precious metal 2'. Therefore, in a case where the oxygen-excess gas flows in the catalyst, the cerium oxide 3' occludes oxygen so as to ease the oxygen-excess state of the gas atmosphere in the vicinity of the precious metal 2'. Furthermore, under the reducing atmosphere in which the amount of oxygen is not sufficient, the cerium oxide 3' releases, in the vicinity of the precious metal 2', oxygen that has been occluded under the oxygen-excess atmosphere. Therefore, it is believed that oxygen can be effectively used.

On the other hand, (b) of FIG. 6 is a plan view schematically illustrating a structure where lanthanum-containing alumina 1' is supported while being adjacent to the cerium oxide 3' and the precious metal 2', where the pore volume of the pores of not less than 160 nm to less than 1000 nm in diameter accounts for not less than 0% but less than 5% in the total pore volume, and the pore volume of the pores of less than 160 nm in diameter accounts for 90% to 100% in the total pore volume, which pore volumes are measured by a mercury penetration method.

In the catalyst having the pore size distribution illustrated in (b) of FIG. 6, the exhaust gas is likely to be adsorbed to neither the precious metal 2' nor the cerium oxide 3'. Therefore, even if the sintering can be inhibited after the durability process, it is believed that the purification reaction of the exhaust gas is not likely to occur.

Note that as to a technique of controlling the pore volume of the pores of the catalyst, a method for producing a catalyst has been disclosed (see Japanese Patent Application, Tokukaisho, No. 61-4532 A (1986), for example). In the method, (i) activated cerium-containing alumina and a cerium oxide are impregnated in an integral mold-type carrier, dried, and baked, so as to form a carrier, the activated cerium-containing alumina having such pore size distribution that a pore volume of pores of 20 nm to 60 nm in diameter accounts for not less than 80% in a total pore volume of the activated cerium-containing alumina, (ii) a main catalyst metal is supported on the resultant carrier, and (iii) the resultant carrier is further coated with a slurry which contains an alumina sol and activated alumina having such pore size distribution that a pore volume of pores of 20 nm to 60 nm in diameter accounts for not less than 80% in the total pore volume of the activated alumina.

Further, there has been disclosed a method for producing a heat-resistant composite oxide which (i) is made from $CeO_2$—$La_2O_3$—$Al_2O_3$ and (ii) has such pore size distribution that a pore volume of pores of 5 nm to 20 nm in diameter accounts for the largest percentage in the total pore volume, the method including the steps of: producing a sol by mixing aluminum alkoxide, barium, lanthanum, and cerium with each other; turning the sol into a gel; and drying and baking the gel (see Japanese Patent Publication No. 2642657, for example).

However, each of the catalysts described above has the following problem. Since a large part of the precious metal particles are provided on the surface of the carrier (see FIG. 5), there are few physical barriers for preventing the sintering of the precious metal. Therefore, the sintering of the precious metal particles is likely to occur when the catalyst is used at a high temperature or subjected to the high-temperature durability process for a long time. Such sintering reduces the catalyst capability.

That is, it is impossible to obtain a desired effect of the present invention by merely controlling the pore volume. In order to obtain the desired effect of the present invention, it is necessary to cause the catalyst to contain a precious metal coated with lanthanum-containing alumina. For this reason, on the basis of the techniques described above, the foregoing preferable ranges of the pore volumes could not have been easily arrived at by even a person skilled in the art.

(Oxygen Absorption)

It is preferable that the exhaust gas purification catalyst of the present embodiment has an oxygen absorption in a range of 30% to 100%, more preferably in a range of 40% to 100%, further preferably in a range of 50% to 100%, furthermore preferably in a range of 80% to 100%.

Here, the "oxygen absorption" means a value determined by a method described in the following Examples. The "oxygen absorption" has a close relationship with the catalyst capability of the exhaust gas purification catalyst. Generally, the higher the oxygen absorption is, the higher the oxygen occlusion/release ability is, i.e. the higher the exhaust gas purification capability is. On the other hand, the lower the oxygen absorption is, the lower the oxygen occlusion/release ability is, i.e. the lower the exhaust gas purification capability is.

An oxygen absorption of 100% means that all oxygen introduced into the exhaust gas purification catalyst is used, that is, the exhaust gas purification catalyst has a significantly high exhaust gas purification capability. On the other hand, in a case where the oxygen absorption becomes not more than 30%, oxygen which could not be absorbed exists in the vicinity of the precious metal. This is not preferable because, in a case where an oxygen concentration in the vicinity of the precious metal is not less than the theoretical air-fuel ratio, the exhaust gas catalyst reaction may not be likely to be developed on the precious metal.

(II) Method for Producing Exhaust Gas Purification Catalyst (i) Preparation of Precious Metal or Complex, Either of which is Coated with Lanthanum-Containing Alumina <Preparation of Precious Metal Coated with Lanthanum-Containing Alumina>

A method for preparing the catalyst of the present embodiment is not particularly limited, and may be a conventionally-known preparation method, provided that the catalyst of the present embodiment, prepared by the method, contains the precious metal coated with lanthanum-containing alumina. For example, the catalyst of the present embodiment can be prepared by the sol-gel method, an alkoxide method, a reverse micelle method, a hydrothermal synthesis method, or the like.

A material of the precious metal may be, but not limited to, nitrate salt, a chloride, acetate salt, organic salt, or the like. For example, a material of rhodium may be, but not particularly limited to, a rhodium nitrate, a rhodium chloride, a rhodium acetate, hexaammine rhodium, or the like. Further, a material of palladium may be a palladium nitrate, a palladium chlorate, a palladium acetate, tetraammine palladium, or the like, for example. Furthermore, a material of platinum may be a platinum nitrate, a tetraammine platinum oxalate, or the like, for example.

A material of lanthanum may be, but not particularly limited to, a lanthanum (III) acetate n-hydrate, a lanthanum nitrite hexahydrate, a lanthanum chloride heptahydrate, a lanthanum (III) sulfate n-hydrate, a lanthanum oxide, or the like, for example. Note that "n" of the "n-hydrate" is an integer not less than 1.

A material of alumina may be, but not particularly limited to, an aluminum-containing sol (such as a boehmite sol), an aluminum isopropoxide, an aluminum ethoxide, an aluminum n-butoxide, an aluminum sec-butoxide, an aluminum nitrate, a basic aluminum nitrate, an aluminum hydroxide, or the like.

Each of the foregoing materials constituting the exhaust gas purification catalyst should be used in an amount which is within a corresponding range among the ranges described above.

How to coat the precious metal with lanthanum-containing alumina is not particularly limited, but it is preferable to select a coating method in accordance with the material of alumina. The following description explains how to coat rhodium with lanthanum-containing aluminum isopropoxide, as an example.

First, aluminum isopropoxide is added to an isopropanol whose mass is substantially equal to that of aluminum isopropoxide. Then, the resultant solution is agitated for 10 minutes. Next, a rhodium nitrate aqueous solution is added to the resultant solution so that an amount of rhodium with respect to aluminum becomes equal to a predetermined amount. Hydrolysis reaction of aluminum isopropoxide is developed in a slightly acidic state or in an acidic state, so that aluminum isopropoxide is turned into an aluminum hydroxide. In this case, it is preferable that the hydrolysis reaction proceeds with water contained in the rhodium nitrate aqueous solution thus added. In a case where the hydrolysis reaction proceeds with water contained in the rhodium nitrate aqueous solution, rhodium is supported while being coated with alumina.

It is preferable to add lanthanum acetate to the resultant solution after (i) the rhodium nitrate aqueous solution is added to the resultant solution and then (ii) aluminum isopropoxide is, at least partially, subjected to the hydrolysis reaction. Here, water is added to the solution, an amount of which is equal to an amount necessary for all aluminum isopropoxide to be subjected to the hydrolysis reaction. Then, the resultant solution is continuously agitated until the hydrolysis of aluminum isopropoxide is finished. The hydrolysis reaction is exothermic reaction. Therefore, it is considered that the time when the hydrolysis is finished is a time when heat generation is finished.

Upon the completion of the hydrolysis reaction, the resultant sample is provided in a form of gel. The gel thus obtained is dried at a temperature preferably in a range of 50° C. to 200° C., more preferably in a range of 70° C. to 150° C. Then, the sample thus dried is baked under the presence of an oxygen-excess atmosphere at a temperature preferably in a range of 30° C. to 950° C., more preferably in a range of 400° C. to 600° C. By carrying out the steps described above, it becomes possible to obtain a rhodium catalyst coated with lanthanum-containing alumina.

Here, it is preferable that an amount of rhodium contained in the catalyst is, per lanthanum-containing alumina powder, in a range of 0.2% by mass to 20% by mass, more preferably in a range of 0.5% by mass to 5% by mass. The reason why the foregoing range is preferable is described below: (1) In a case where the amount of rhodium contained in the catalyst is less than 0.2% by mass, a ratio of rhodium coated with lanthanum-containing alumina becomes too high. That is, an amount of rhodium that is exposed to the gas phase becomes too small. This may reduce the catalyst capability. (2) On the other hand, in a case where the amount of rhodium is more than 20% by mass, a ratio of the rhodium particles that could not be coated with lanthanum-containing alumina becomes too high.

<Preparation of Complex Coated with Lanthanum-Containing Alumina>

The complex of the present embodiment, (i) which is made of the precious metal and the cerium oxide, and (ii) which is, at least partially, coated with lanthanum-containing alumina, can be produced by the method described in the foregoing <Preparation of precious metal coated with lanthanum-containing alumina>.

The materials of alumina, lanthanum, and the precious metal can be selected from various materials described in the foregoing <Preparation of precious metal coated with lanthanum-containing alumina>.

The material of the cerium oxide may be a cerium oxide or a material which can be turned into the cerium oxide through a drying step and a baking step. For example, the material of the cerium oxide may be a cerium (III) nitrate hexahydrate, a cerium (III) acetate monohydrate, or a ceria sol.

Each of the components (materials) constituting the exhaust gas purification catalyst should be used in an amount in a corresponding range among the ranges described above.

In the present embodiment, how to coat the complex made of the precious metal and the cerium oxide with lanthanum-containing alumina is not particularly limited, but it is preferable to select a coating method in accordance with the material of alumina. For example, it is possible to suitably coat the complex with lanthanum-containing alumina by (i) adding, to an alcohol solution of aluminum alkoxide, a mixed solution of an aqueous solution containing the precious metal and an aqueous solution of the cerium oxide, (ii) adding water containing lanthanum to the resultant solution, and (iii) drying the resultant solution, and, if necessary, baking the resultant sample.

Further, in a case where rhodium and the cerium oxide are coated with lanthanum-containing aluminum isopropoxide, the foregoing operations for coating rhodium with lanthanum-containing aluminum isopropoxide can be similarly carried out, for example. That is, (i) the rhodium nitrate and the cerium acetate should be weighed so that an amount of rhodium with respect to alumina is equal to a predetermined amount, (ii) these are mixed with each other so as to produce a rhodium nitrate-cerium acetate mixed aqueous solution, and (iii) the mixed solution is added in place of the rhodium nitrate solution described above.

(ii) Method for Producing Exhaust Gas Purification Catalyst How to prepare the catalyst is not particularly limited.

However, in a case where a catalyst composite itself is provided as the catalyst, the catalyst composite may be (i) sufficiently agitated, and (ii) then molded into a circular cylinder shape, a globular sphere shape, or the like, for example.

Note that the catalyst composite can contain various components described above, such as alumina, the fire-resistant inorganic oxide (such as the ceria-zirconia composite oxide), the cerium oxide which is not coated with lanthanum-containing alumina, and/or the precious metal which is not coated with lanthanum-containing alumina. Materials of the components may be identical with the ones described above, and each of the components may be contained in an amount in a corresponding range among the ranges described above.

It is preferable that the exhaust gas purification catalyst of the present embodiment is supported on the three-dimensional structure.

In a case where the integral structure (e.g. the three-dimensional structure) or an inactive inorganic carrier (hereinafter, referred to as "integral structure or the like") is used, the following method may be employed. All of the catalyst composite is introduced into a ball mill or the like at one time, and is subjected to wet-milling. An aqueous slurry is thus obtained. The integral structure or the like is immersed in the aqueous slurry, and then dried and baked. The catalyst is thus supported on the integral structure or the like.

<Production Method Employing Alumina Sol as Material of Complex>

The following description deals with, as an example of the present embodiment, how to produce an exhaust gas purification catalyst by employing an alumina sol as a material of the complex.

The term "sol" used here is identical with a collide solution, in which particles are dispersed in a liquid and have flowability. Further, the term "gel" used here is identical with a state where the collide particles lose their own mobility (flowability) so as to form a three-dimensional network structure.

Specifically, the state where the collide particles lose their flowability is defined by a gel viscosity in a range of 5,000 cP to 500,000 cP, preferably in a range of 10,000 cP to 100,000 cP, more preferably in a range of 12,000 cP to 50,000 cP. The reason why the foregoing range is preferable is described below: (1) In a case where the gel viscosity is not less than 5,000 cP, the gelatification is sufficiently developed. Accordingly, it is possible to take the precious metal and the cerium oxide into the three-dimensional network structure without any problems. In this case, the precious metal and the cerium oxide are sufficiently coated with lanthanum-containing alumina. (2) In a case where the gel viscosity is not more than 500,000 cP, a viscosity of the slurry at a step for preparing the slurry would not become too high. Accordingly, it becomes possible to coat the three-dimensional structure with the slurry by the washcoating without any problems.

Here, in order to turn the sol into the gel, it is necessary to set a pH at which the sol cannot maintain its form stably. For example, in order to turn, into a gel, a sol which is stable at a pH in a range of 3 to 5, it is necessary to set the pH to be less than 3 or more than 5.

In a case where the alumina sol is used as the material of the complex, the following method may be used, for example. That is, the gel in which the complex made of the precious metal and the cerium oxide is coated with the lanthanum-containing alumina gel is neither dried nor baked but is mixed with another catalyst composite. The gel is thus turned into an aqueous slurry. Then, the three-dimensional structure is immersed in the aqueous slurry, and then dried and baked.

That is, in the foregoing case, it is preferable that the method for producing an exhaust gas purification catalyst includes: a step for producing a gel; a step for turning the gel into a slurry; a step for carrying out the washcoating; and a step for drying and baking the slurry. According to the method, when producing such a catalyst that the complex in which the precious metal and the cerium oxide are coated with lanthanum-containing alumina is supported on the three-dimensional structure, it is possible to (i) reduce the number of times that the baking step is carried out, and (ii) therefore reduce a cost for carrying out the baking step and a time period for producing the catalyst. Accordingly, it is possible to produce the exhaust gas purification catalyst at lower cost and with higher production efficiency.

(Step for Producing Gel)

The step for producing a gel is a step for producing the gel in which the complex made of the precious metal and the cerium oxide is coated with the lanthanum-containing alumina gel. Specifically, the gel can be produced by the following method.

For example, in a case where an alumina sol having a pH of 4 (stable at a pH in a range of 3 to 5) is used, the gelatification is developed by adding, to the alumina sol, a mixed solution of a nitrate salt precious metal solution and a material of cerium so that the resultant solution has a pH of 1.0. Here, the viscosity of the solution should be not less than 5,000 cP. The resultant solution is agitated until a change in viscosity falls within a range of ±100 cP/second. Then, lanthanum-containing water is further added thereto. Thereby, it is possible to obtain a complex in which a precious metal source and a cerium oxide source are taken into the three-dimensional network structure of the gel by the lanthanum-containing alumina gel. By coating, by the washcoating, the three-dimensional structure with (i) the complex, (ii) the fire-resistant inorganic oxide, and (iii) the like, it becomes thus possible to obtain the catalyst in which the precious metal and the cerium oxide are coated with lanthanum-containing alumina.

(Step for Producing Slurry)

The step for producing the slurry is a step for turning, into a slurry, the gel in which the complex made of the precious metal and the cerium oxide is coated with the lanthanum-containing alumina gel. Specifically, the slurry can be obtained by (i) mixing the gel with another component(s) such as the fire-resistant inorganic oxide, and then (ii) causing the mixed solution to be subjected to the wet milling.

Here, it is preferable that an amount of the complex in the mixed solution of the complex and the another component(s) (such as the fire-resistant inorganic oxide) is in a range of 2% by mass to 40% by mass, more preferably in a range of 5% by mass to 20% by mass. The reason why the foregoing range is preferable is described below: (1) In a case where the amount of the complex in the mixed solution is not less than 2% by mass, the ratio of the complex in the mixed solution becomes sufficiently high. This makes it possible to cause the catalyst to have a sufficient increase in heat resistance. (2) In a case where the amount of the complex contained in the mixed solution is not more than 40% by mass, the ratio of the complex in the mixed solution does not become too high. This makes it possible to easily adjust the pore size distribution to be within a predetermined range.

The "wet-milling" means the milling of the mixed solution of the complex and the another component(s) (such as the fire-resistant inorganic oxide) by use of a milling apparatus such as a ball mill.

It is preferable that the particle diameter of the mixed components in the slurry is in a range of 2 μm to 10 μm, more preferably in a range of 3 μm to 8 μm, which particle diameter is measured by a dynamic light scattering method. In a case where the particle diameter is in the foregoing range, it is possible to cause the catalyst to adhere to the three-dimensional structure more tightly. Therefore, it is possible to cause the three-dimensional structure to support the catalyst having the predetermined pore size distribution without any problems. Further, it is preferable that a concentration of a solid content contained in the slurry is in a range of 10% by mass to 60% by mass.

(Step for Carrying Out Washcoating)

The step for carrying out the washcoating is a step for causing the three-dimensional structure to support the slurry.

(Step for Carrying Out Drying and Baking)

The step for carrying out the drying and the baking is a step for drying and baking the three-dimensional structure which is coated with the slurry by the washcoating. Conditions for the drying and the baking, such as temperatures and time periods necessary for carrying out the drying or the baking, are not particularly limited, but it is preferable that the conditions are set so that the drying and the baking are carried out until the three-dimensional structure does not have a change in mass.

It is preferable, for example, that the drying is carried in an atmosphere at a temperature in a range of 50° C. to 200° C. (more preferably in a range of 80° C. to 180° C.) for a time period in a range of 5 minutes to 10 hours (more preferably in a range of 10 minutes to 8 hours).

Further, for example, it is preferable that the baking is carried out at a temperature in a range of 300° C. to 1000° C. (more preferably in a range of 400° C. to 500° C.) for a time period in a range of 30 minutes to 10 hours (more preferably in a range of 1 hour to 6 hours). This is because: in a case where the baking is carried out at a temperature not less than 300° C., the hydrocarbon and the like, contained in the slurry, can be successfully burned away; and in a case where the baking is carried out at a temperature less than 1000° C., contraction of the pores can be inhibited.

(III) Method for Purifying Exhaust Gas

A method of the present embodiment, for purifying an exhaust gas, includes a step of exposing the exhaust gas purification catalyst to an exhaust gas emitted from an internal-combustion engine. Here, in present specification, the description "exposing the exhaust gas purification catalyst to the exhaust gas" means that the exhaust gas purification catalyst is in contact with the gas, and includes not only the case where all of the surface of the catalyst is in contact with the exhaust gas but also the case where the surface of the catalyst is partially in contact with the exhaust gas.

How to expose the catalyst to the exhaust gas is not particularly limited. For example, the exhaust gas purification catalyst may be exposed to the exhaust gas in such a manner that (i) the exhaust gas purification catalyst is placed in an arbitral position in an exhaust gas path of an exhaust port of the internal-combustion engine, and (ii) the internal-combustion engine emits the exhaust gas into the exhaust gas path.

How long the catalyst is exposed to the exhaust gas is not particularly limited, provided that the catalyst is, at least partially, in contact with the exhaust gas.

The temperature of the exhaust gas is not particularly limited, but it is preferable that the exhaust gas has a temperature in a range of 0° C. to 750° C., which is a normal temperature range for normal driving. Here, it is preferable that the exhaust gas has an air-fuel ratio in a range of 13.1 to 16.1, which exhaust gas has a temperature in the range of 0° C. to 750° C. and is emitted from the internal-combustion engine.

Further, in a case where the exhaust gas has a temperature in the range of 0° C. to 750° C., the exhaust gas purification catalyst may be exposed to another exhaust gas having a temperature in a range of 800° C. to 1000° C. before the exhaust gas purification catalyst is exposed to the foregoing exhaust gas emitted from the internal-combustion engine.

It is preferable that the another exhaust gas has an air-fuel ratio in a range of 10 to 18.6, which another exhaust gas has a temperature in the range of 800° C. to 1000° C. Further, how long the exhaust gas purification catalyst is exposed to such an oxygen-excess exhaust gas having a temperature in the range of 800° C. to 1000° C. is not particularly limited. For example, the exhaust gas purification catalyst can be exposed to the another exhaust gas for a time period in a range of 5 hours to 100 hours.

Note that it is preferable that (i) the exhaust gas has a temperature in the range of 0° C. to 750° C. at a catalyst entry part, and (ii) the another exhaust gas has a temperature in the range of 800° C. to 1000° C. at a catalyst bed part.

In one embodiment of the present invention, the method of the present invention, for purifying an exhaust gas, may include the steps of: (i) exposing the exhaust gas purification catalyst of the present invention to the oxygen-excess exhaust gas (e.g. an exhaust gas having an air-fuel ratio preferably in a range of 14.1 to 15.1) having a temperature in a range of 950° C. to 1000° C.; and (ii) exposing, after the step (i), the exhaust gas purification catalyst to the exhaust gas (whose temperature is in the range of 0° C. to 750° C.) emitted from the internal-combustion engine.

In this case, how long the exhaust gas purification catalyst is exposed to the exhaust gas having a temperature in the range of 0° C. to 750° C. is not particularly limited, provided that a time period is ensured for the exhaust gas purification catalyst to be, at least partially, in contact with the exhaust gas having a temperature in the range of 0° C. to 750° C. Further, how long the exhaust gas purification catalyst is exposed to such an oxygen-excess exhaust gas having a temperature in the range of 950° C. to 1000° C. is also not particularly limited. The exhaust gas purification catalyst may not be exposed to the oxygen-excess exhaust gas at all or may be exposed for a time period in a range of 5 hours to 100 hours, which is a preferable range for a time period of the high-temperature durability process.

Note that it is preferable that (i) the exhaust gas has a temperature in the "range of 0° C. to 750° C." at the catalyst entry part, and (ii) the oxygen-excess exhaust gas has a temperature in the "range of 950° C. to 1000° C." at the catalyst bed part. Further, it is preferable that the exhaust gas (whose temperature is in a range of 0° C. to 750° C.) emitted from the internal-combustion engine has an air-fuel ratio in a range of 14.1 to 15.1.

Note that the "catalyst entry part" is an internal part of an exhaust pipe, which internal part has a space provided (i) between an end surface of the placed catalyst on an exhaust gas inflow side and a plane 20 cm away from the end surface toward the internal-combustion engine, and (ii) at the center of a cross-sectional shape of the exhaust pipe. Further, the "catalyst bed part" is a part (i) at a middle position between the end surface of the catalyst on the exhaust gas inflow side and the other end surface on an exhaust gas outflow side, and (ii) at the center of the cross-sectional shape of the exhaust pipe (in a case where the exhaust pipe has a shape other than a circular shape as its cross-sectional shape, the part is positioned at a center of mass of the cross-sectional shape).

Moreover, the "normal driving" means a state where a vehicle or a two-wheel vehicle, having an internal-combustion engine, is being driven normally but not driven at a significantly high speed or a significantly low speed. For example, the normal driving may be an LA-4 mode driving or the like.

The exhaust gas is not particularly limited, provided that the exhaust gas is an exhaust gas emitted from the internal-combustion engine. Examples of the exhaust gas encompass: a nitrogen oxide (e.g. NO, $NO_2$, or $N_2O$); carbon monoxide; carbon dioxide; oxygen; hydrogen; ammonia; water; sulfur dioxide; and various hydrocarbons.

The internal-combustion engine is not particularly limited. Examples of the internal-combustion engine encompass: a gasoline engine; a hybrid engine; and an engine uses a fuel such as a natural gas, ethanol, or dimethyl ether. Among these, it is particularly preferable that the gasoline engine is used as the internal-combustion engine.

As described above, the exhaust gas purification catalyst of the present invention has a heat resistance and an effect of inhibiting a precious metal such as rhodium from forming a solid solution. Therefore, the sintering of the precious metal can be inhibited, even if (i) an oxygen-excess exhaust gas flows into an exhaust gas path during purification of an exhaust gas generated by normal driving, and (ii) the oxygen-excess exhaust gas has a significantly high temperature (e.g. a temperature in a range of 950° C. to 1000° C.) as compared with the exhaust gas generated by the normal driving. Therefore, it is possible to continuously purify the exhaust gas generated by the normal driving even after the oxygen-excess exhaust gas flows into the exhaust gas purification catalyst.

Further, according to the structure in which the exhaust gas purification catalyst contains the precious metal-cerium oxide complex coated with lanthanum-containing alumina, the exhaust gas purification catalyst further has an oxygen occlusion/release ability. According to the structure, it is possible to continuously purify the exhaust gas generated by the normal driving without any problems, even after another exhaust gas flows into the exhaust gas path during purification of the exhaust gas generated by normal driving, the another exhaust gas having a significantly high temperature (e.g. a temperature in a range of 800° C. to 1000° C., preferably in a range of 950° C. to 1000° C.) as compared with the exhaust gas generated by the normal driving.

The present invention described above can also be expressed as follows:

(1) An exhaust gas purification catalyst containing at least rhodium coated with lanthanum-containing alumina.

(2) The exhaust gas purification catalyst according to the foregoing (1), wherein: an amount of lanthanum contained in the exhaust gas purification catalyst is in a range of 0.5% by mass to 30% by mass with respect to a total amount of lanthanum and alumina.

(3) The exhaust gas purification catalyst according to the foregoing (1) or (2), wherein: the exhaust gas purification catalyst keeps containing rhodium coated with lanthanum-containing alumina, even after the exhaust gas purification catalyst is exposed to an oxygen-excess gas having a temperature in a range of 950° C. to 1000° C.

(4) The exhaust gas purification catalyst according to the foregoing (3), wherein: an exposed surface area of rhodium is reduced or unchanged in a case where the exhaust gas purification catalyst is exposed to the foregoing gas.

(5) The exhaust gas purification catalyst according to the foregoing (4), wherein: the exposed surface area of rhodium is reduced by a percentage in a range of 0% to 80% in a case where the exhaust gas purification catalyst is exposed to the foregoing gas.

(6) The exhaust gas purification catalyst according to any one of the foregoing (3) through (5), wherein: 20% or less of rhodium in atomic ratio is mixed into alumina to form a solid solution of alumina and rhodium after the exhaust gas purification catalyst is exposed to the foregoing gas.

(7) The exhaust gas purification catalyst according to any one of the foregoing (1) through (6), wherein: the exhaust gas purification catalyst is supported on a three-dimensional structure.

(8) The exhaust gas purification catalyst according to any one of the foregoing (1) through (7), further containing platinum and/or palladium.

(9) The exhaust gas purification catalyst according to any one of the foregoing (1) through (8), further containing a fire-resistant inorganic oxide.

(10) The exhaust gas purification catalyst according to any one of the foregoing (1) through (9), further containing a cerium oxide and/or a ceria-zirconia composite oxide, neither of which is coated with lanthanum-containing alumina.

(11) A method for purifying an exhaust gas, the method including the step of exposing an exhaust gas purification catalyst according to any one of the foregoing (1) through (10) to an exhaust gas emitted from an internal-combustion engine.

(12) The method according to the foregoing (11), wherein: the exhaust gas emitted from the internal-combustion engine has a temperature in a range of 0° C. to 750° C.; and the exhaust gas purification catalyst may be exposed to an oxygen-excess exhaust gas having a temperature in a range of 950° C. to 1000° C., before the exhaust gas purification catalyst is exposed to the exhaust gas emitted from the internal-combustion engine.

(13) The method according to the foregoing (11) or (12), wherein: the exhaust gas emitted from the internal-combustion engine has (i) a temperature in a range of 0° C. to 750° C. and (ii) an air-fuel ratio in a range of 14.1 to 15.1.

Further, the present invention can also be expressed as described below.

(1) An exhaust gas purification catalyst contains a complex made of a precious metal and a cerium oxide, the complex being coated with lanthanum-containing alumina.

(2) The exhaust gas purification catalyst according to the foregoing (1), wherein: a compound made of the precious metal and cerium is formed at an interface between the precious metal and the cerium oxide.

(3) The exhaust gas purification catalyst according to the foregoing (2), wherein: an amount of the cerium oxide contained in the complex is greater than an amount of the compound contained in the complex.

(4) The exhaust gas purification catalyst according to any one of the foregoing (1) through (3), wherein: the precious metal is rhodium.

(5) The exhaust gas purification catalyst according to any one of the foregoing (1) through (4), wherein the compound is CeRh.

(6) The exhaust gas purification catalyst according to any one of the foregoing (1) through (5), wherein: the amount of the cerium oxide contained in the complex is in a range of 1% by mass to 30% by mass with respect to a total amount of the precious metal, the cerium oxide, lanthanum, and alumina, each of which is contained in the exhaust gas purification catalyst.

(7) The exhaust gas purification catalyst according to any one of the foregoing (1) through (6), wherein: the exhaust gas purification catalyst keeps containing the complex coated with lanthanum-containing alumina, even after the exhaust gas purification catalyst is exposed to an exhaust gas which (i) has a temperature in a range of 950° C. to 1000° C. and (ii) is emitted from an internal-combustion engine.

(8) The exhaust gas purification catalyst according to the foregoing (7), wherein: in a case where the exhaust gas purification catalyst is exposed to the foregoing exhaust gas, an exposed surface area of the precious metal is reduced by a percentage in a range of 0% to 87% with respect to an exposed surface area of the precious metal before the exposure.

(9) The exhaust gas purification catalyst according to the foregoing (8), wherein: the exhaust gas purification catalyst has an oxygen absorption in a range of 30% to 100%.

(10) The exhaust gas purification catalyst according to any one of the foregoing (1) through (9), wherein: the exhaust gas purification catalyst is supported on a three-dimensional structure.

(11) The exhaust gas purification catalyst according to any one of the foregoing (1) through (10), further containing platinum and/or palladium, neither of which is coated with lanthanum-containing alumina.

(12) The exhaust gas purification catalyst according to any one of the foregoing (1) through (11), further containing a fire-resistant inorganic oxide.

(13) The exhaust gas purification catalyst according to any one of the foregoing (1) through (12), further containing a cerium oxide and/or a ceria-zirconia composite oxide, neither of which is coated with lanthanum-containing alumina.

(14) A method for purifying an exhaust gas, the method including the step of exposing an exhaust gas purification catalyst according to any one of the foregoing (1) through (13) to an exhaust gas emitted from an internal-combustion engine.

(15) The method according to the foregoing (14), wherein: the exhaust gas emitted from the internal-combustion engine has a temperature in a range of 0° C. to 750° C.; and the exhaust gas purification catalyst has been exposed to another exhaust gas having (i) a temperature in a range of 950° C. to 1000° C. and (ii) an air-fuel ratio in a range of 14.1 to 15.1, before the exhaust gas purification catalyst is exposed to the exhaust gas emitted from the internal-combustion engine.

Furthermore, the present invention can also be expressed as described below.

(1) An exhaust gas purification catalyst containing a complex made of a precious metal and a cerium oxide, the complex being, at least partially, coated with lanthanum-containing alumina, the exhaust gas purification catalyst having such pore size distribution that a pore volume of pores of not less than 160 nm but less than 1000 nm in diameter accounts for 5% to 20% in a total pore volume of the exhaust gas purification catalyst.

(2) The exhaust gas purification catalyst according to the foregoing (1), wherein: a pore volume of pores of less than 160 nm in diameter accounts for 70% to 90% in the total pore volume of the exhaust gas purification catalyst.

(3) The exhaust gas purification catalyst according to the foregoing (1) or (2), wherein: the precious metal is at least one selected from the group consisting of rhodium, palladium, and platinum.

(4) The exhaust gas purification catalyst according to any one of the foregoing (1) through (3), further containing a fire-resistant inorganic oxide whose melting point is not less than 1000° C.

(5) The exhaust gas purification catalyst according to any one of the foregoing (1) through (4), wherein: the exhaust gas purification catalyst is supported on a three-dimensional structure.

(6) The exhaust gas purification catalyst according to any one of the foregoing (1) through (5), further containing a cerium oxide and/or a ceria-zirconia composite oxide, neither of which is coated with lanthanum-containing alumina.

(7) A method for purifying an exhaust gas, the method including the step of exposing an exhaust gas purification catalyst according to any one of the foregoing (1) through (6) to an exhaust gas emitted from an internal-combustion engine.

(8) The method according to the foregoing (7), wherein: the exhaust gas emitted from the internal-combustion engine has a temperature in a range of 0° C. to 750° C.; and the exhaust gas purification catalyst has been exposed to another exhaust gas having (i) a temperature in a range of 800° C. to 1000° C. and (ii) an air-fuel ratio in a range of 10 to 18.6, before the exhaust gas purification catalyst is exposed to the exhaust gas emitted from the internal-combustion engine.

(9) A method for producing an exhaust gas purification catalyst according to any one of the foregoing (1) through (6), the method including the step of producing a gel in which a complex made of a precious metal and a cerium oxide is coated with a lanthanum-containing alumina gel.

(10) The method according to the foregoing (9), further including the steps of: turning, into a slurry, the gel in which the complex made of the precious metal and the cerium oxide is coated with the lanthanum-containing alumina gel; coating a three-dimensional structure with the slurry by washcoating; and drying and baking the three-dimensional structure which is coated with the slurry by the washcoating.

EXAMPLES

Examples and Comparative Examples of the present invention are described below so that details of the present invention can be understood more clearly. Note that the present invention is not limited to the following Examples.

(I) Catalyst Containing Rhodium Coated with Lanthanum-Containing Alumina

Production of Exhaust Gas Purification Catalyst (1)

Example 1

Aluminum isopropoxide (material of alumina), a rhodium nitrate aqueous solution (material of rhodium), and a lanthanum acetate (material of lanthanum) were weighed so that a mass ratio of alumina:rhodium:lanthanum was adjusted to be 97:3:5. The weighed aluminum isopropoxide was added to ethanol whose mass was equal to that of the weighed aluminum isopropoxide, and the resultant solution was agitated for 10 minutes. Then, the rhodium nitrate aqueous solution was added to the aluminum isopropoxide/ethanol solution.

Next, the lanthanum acetate was dispersed in water whose mass was equal to a mass necessary for hydrolysis reaction of the weighed aluminum isopropoxide. Then, the resultant solution was added to the aluminum isopropoxide/ethanol/rhodium nitrite solution, and the mixed solution was agitated for 2 hours. The mixed solution was dried at 120° C. for 8 hours, and then baked at 500° C. for hour under the presence of an atmosphere. Rhodium-coating alumina powder A, containing 2.86% by mass of lanthanum and 4.76% by mass of rhodium, was thus obtained.

Comparative Example 1

Aluminum isopropoxide (material of alumina) and a rhodium nitrate aqueous solution (material of rhodium) were weighed so that a mass ratio of alumina:rhodium was adjusted to be 20:1. The weighed aluminum isopropoxide was added to ethanol whose mass was equal to that of the weighed aluminum isopropoxide, and the resultant solution was agitated for 10 minutes. Then, the rhodium nitrate aqueous solution was added to the aluminum isopropoxide/ethanol solution.

Next, water whose mass was equal to a mass necessary for hydrolysis reaction of the weighed aluminum isopropoxide was added to the aluminum isopropoxide/ethanol/rhodium nitrate solution, and the mixed solution was agitated for 2 hours. The mixed solution was dried at 120° C. for 8 hours, and was baked at 500° C. for hour under the presence of an atmosphere. Rhodium-coating alumina powder B, containing 4.76% by mass of rhodium, was thus obtained.

Comparative Example 2

Lanthanum (3% by mass)-containing alumina and a rhodium nitrate were weighed so that a mass ratio of lanthanum (3% by mass)-containing alumina:rhodium was adjusted to be 20:1. The rhodium nitrate was supported on the weighed lanthanum-containing alumina by a pore filling method (see Dictionary of Catalyst, Page 174, Asakura Shoten). The resultant solution was dried at 120° C. for 8 hours, and was baked at 500° C. for 1 hour under the presence of an atmosphere. Rhodium-impregnation alumina powder C, containing 4.76% by mass of rhodium, was thus obtained.

<How to Measure Exposed Surface Area of Rhodium>

The exposed surface area of rhodium was measured basically in accordance with a CO pulse method, proposed by the Committee on Reference Catalyst of the Catalysis Society of Japan (Catalyst, 1986, vol. 28, No. 1). In the present example, rhodium was coated with alumina. Therefore, in order to sufficiently develop a process prior to a process for reducing rhodium, a temperature at which the reducing process was carried out was set to be 500° C.

<Measurement of Exposed Surface Area of Rhodium>

Figure 7:
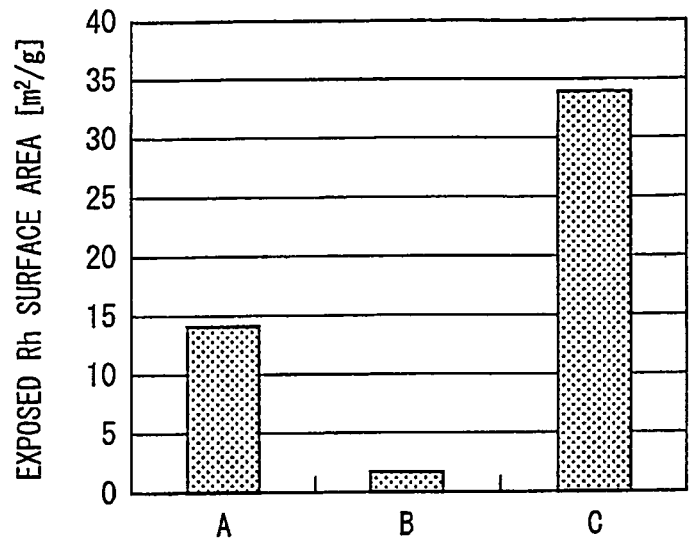
FIG. 7 is a view showing a result of measurement of an exposed surface area of rhodium, which measurement was carried out for each of powders A, B, and C.

FIG. 7 is a view showing a result of measurement of the exposed surface area of rhodium, which measurement was carried out for each of the powders A, B, and C by the foregoing method.

As shown in FIG. 7, either the powder A which contained lanthanum and the coated rhodium or the powder B which contained the coated rhodium had a smaller exposed surface area of rhodium than that of the powder C produced by the pore filling method. Note that in FIGS. 7 through 9, "A" indicates the powder A, "B" indicates the powder B, and "C" indicates the powder C.

Here, it is shown that the rhodium particles were coated with alumina in the powders A and B, because (i) the powders A, B, and C contained the same mass of rhodium, and (ii) the powders A and B were significantly smaller in exposed surface area of rhodium than the powder C while all of the powders A, B, and C had not been subjected to a durability process at a temperature at which rhodium particles were turned into larger blocks due to sintering.

Figure 8:
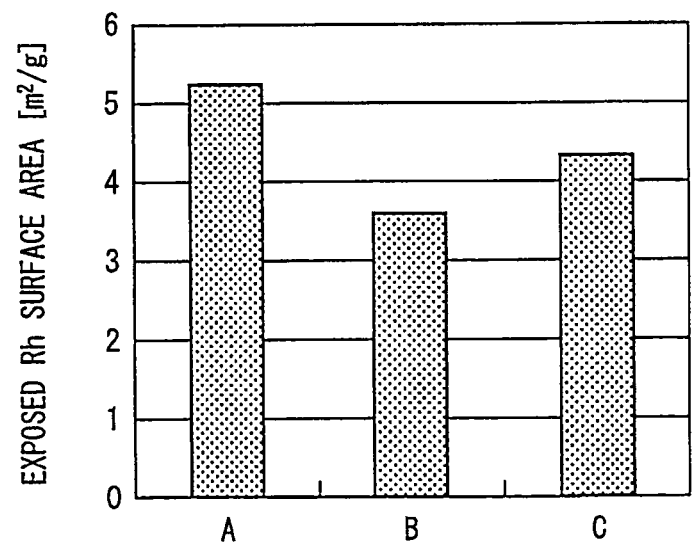
FIG. 8 is a view showing a result of measurement of the exposed surface area of rhodium, which measurement was carried out for each of the powders A, B, and C after each of the powders A, B, and C was subjected to a durability process at 950° C. for 50 hours under the presence of an atmosphere.

Next, the powders A, B, and C were subjected to the durability process at 950° C. for 50 hours under the presence of an atmosphere. Then, the exposed surface area of rhodium was measured for each of the powders A, B, and C in the same manner as described above. FIG. 8 shows the result of the measurement.

FIG. 8 shows that the powder A in which rhodium was coated with lanthanum-containing alumina had the largest exposed surface area of rhodium, the powder C in which rhodium was supported by impregnation had the second largest exposed surface area of rhodium, and the powder B in which rhodium was coated with alumina containing no lanthanum had the smallest exposed surface area of rhodium.

Figure 9:
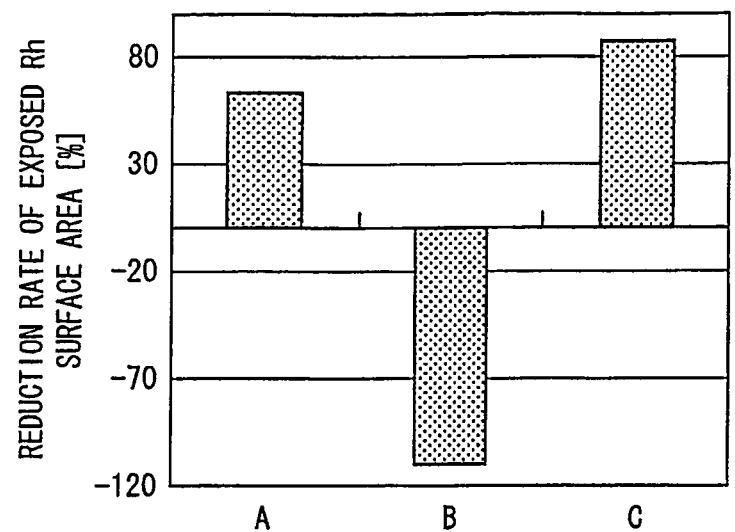
FIG. 9 is a view showing a reduction rate of the exposed surface area of rhodium, which reduction rate was calculated by comparing the exposed surface area of rhodium, measured before the catalyst is subjected to the durability process at 950° C. for 50 hours under the presence of an atmosphere, with the exposed surface area of rhodium, measured after the catalyst is subjected to the durability process.

FIG. 9 shows, for each of the powders A, B, and C, a reduction rate of the exposed surface area of rhodium, which was calculated by comparing the exposed surface area of rhodium, measured before the powder was subjected to the durability process carried out at 950° C. for 50 hours, with that of rhodium, measured after the durability process. In order to find the reduction rate, the foregoing Formula (2) was used.

FIG. 9 shows that (i) the powder A in which rhodium was coated with lanthanum-containing alumina, and the powder C in which rhodium was supported by the impregnation were reduced in exposed surface area of rhodium through the durability process, and (ii) the powder A had a lower reduction rate of the exposed surface area of rhodium than that of the powder C. In contrast, the powder B in which rhodium was coated with alumina containing no lanthanum was increased in exposed surface area of rhodium through the durability process, and its reduction rate of the exposed surface area of rhodium had a negative value.

The reason why the powder B had the negative value as the reduction rate of the exposed surface area of rhodium may be as described below: (1) Rhodium that had been mixed in alumina and had formed a solid solution in combination with alumina was separated out again due to an $H_2$ reducing process at a time of the measurement of the exposed surface area of rhodium. (2) Alumina coating rhodium was contracted due to heat deterioration so that there were rhodium atoms newly exposed.

<Measurement of Rhodium that has Formed Solid Solution>

Table 1 shows a ratio of rhodium atoms (At %) that were mixed in alumina and therefore formed a solid solution in combination with alumina, which ratio was calculated by (i) XPS analysis and (ii) by use of the foregoing Formula (1).

TABLE 1

|  | Before durability process | After durability process at 950° C. | After durability process at 1000° C. |
| --- | --- | --- | --- |
| Powder A | 0 | 0 | 11.0 |
| Powder B | 0 | 21.8 | 25.4 |
| Powder C | 0 | 0 | 9.8 |

As shown in Table 1, the rhodium forming the solid solution was not confirmed in the powder C in which rhodium was supported by the impregnation (produced by the impregnation method), after the powder C was subjected to the durability process at 950° C. for 50 hours. Similarly, the rhodium forming the solid solution was not confirmed in the powder A in which rhodium was coated with lanthanum-containing alumina. In contrast, 21.8 At % of the rhodium forming the solid solution was confirmed in the powder B in which rhodium was coated with alumina containing no lanthanum, after the durability process at 950° C. for 50 hours.

In a case where the powders A, B, and C were subjected to the durability process at 1000° C., the rhodium forming the solid solution was confirmed in each of the powders A, B, and C. However, each of the powders A and C had a smaller ratio of the rhodium forming the solid solution, as compared with the powder B.

As described above, it was demonstrated that, by coating rhodium with lanthanum-containing alumina, it becomes possible to inhibit rhodium from forming a solid solution in combination with alumina.

<Measurement of BET (Brunauer-Emmett-Teller) Surface Area>

Figure 10:
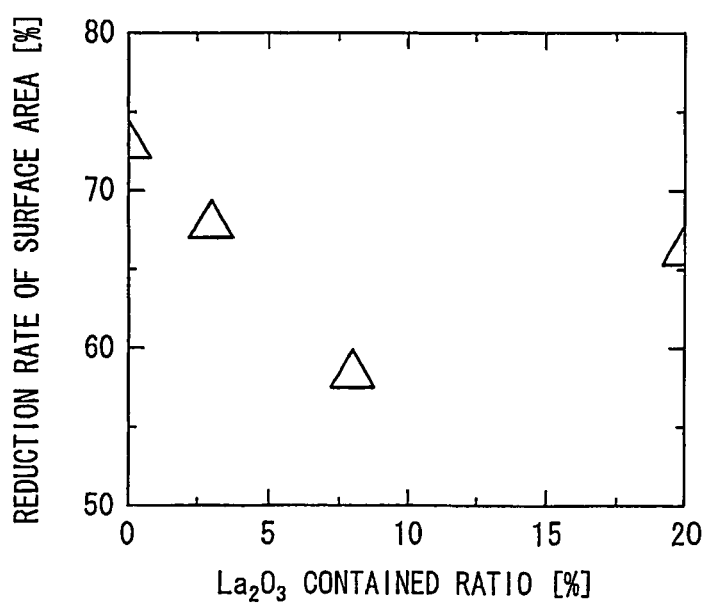
FIG. 10 is a view showing a reduction rate of a BET surface area, which reduction rate was calculated by comparing the BET surface area of the exhaust gas purification catalyst, measured before the catalyst is subjected to the durability process at 950° C. for 50 hours under the presence of an atmosphere, with that of the exhaust gas purification catalyst, measured after the catalyst is subjected to the durability process.

FIG. 10 shows a reduction rate of a BET surface area of an exhaust gas purification catalyst, which reduction rate was calculated by comparing the BET surface area of the catalyst, measured before the catalyst was subjected to the durability process at 950° C. for 50 hours, with the BET surface area of the catalyst, measured after the catalyst is subjected to the durability process. The reduction rate of the BET surface area through the durability process is defined by the following Formula (3).

[Formula 3]

$$\text{Reduction rate of surface area} \ [\%] = \frac{\text{Surface area before durability process} - \text{Surface area after durability process}}{\text{Surface area before durability process}} \times 100 \quad (3)$$

In FIG. 10, a horizontal axis shows a ratio (% by mass) of an amount of lanthanum ($La_2O_3$) in the exhaust gas purification catalyst, and a vertical axis shows a reduction rate of the BET surface area, calculated in accordance with Formula (3). As shown in FIG. 10, the catalyst that contained lanthanum had a lower reduction rate than that of the catalyst that contained no lanthanum (0% by mass). That is, it is believed that in a case where the catalyst contains no lanthanum, a coating layer thereof can be easily broken. Further, as the amount of lanthanum in the catalyst became greater, the reduction rate of the surface area was reduced. Around 8% by mass of lanthanum, the catalyst exhibited a minimum reduction rate of the surface area.

Production of Exhaust Gas Purification Catalyst (2)

Example 2

A dinitro-diammine platinum aqueous solution (material of platinum), a palladium nitrate (material of palladium), lanthanum (3% by mass)-containing alumina (material of alumina), a $CeO_2$—$ZrO_2$ composite oxide, and the powder A were weighed so that a mass ratio of Pt:Pd:$La_2O_3$—$Al_2O_3$:$CeO_2$—$ZrO_2$:$La_2O_3$:powder A was adjusted to be 0.06:0.2:31.2:30:5.04:4. Next, these were mixed with each other, and the mixed solution was agitated for 2 hours. Then, the mixed solution was subjected to wet milling. A slurry A was thus obtained. The slurry A thus obtained was applied to 0.92 L of cordierite by washcoating so that 70.5 g of the slurry A was provided per liter of cordierite after being baked at 500° C. for 1 hour in the following step. After being dried at 150° C. for 15 minutes, the slurry A was baked at 500° C. for 1 hour in an atmosphere. Thereby, a catalyst A was obtained. The catalyst A contained, per liter of the catalyst A, 0.06 g of Pt, 0.2 g of Pd, and 0.24 g of Rh.

Comparative Example 3

A catalyst B was produced by the same method and by use of the same ratio of materials as in Example 2, except that the powder B was used in place of the powder A.

Comparative Example 4

A catalyst C was produced by the same method and by use of the same ratio of materials as in Example 2, except that the powder C was used in place of the powder A.

<Durability Process for Exhaust Gas Purification Catalyst>

Each of the catalysts A, B, and C was placed 40 cm downstream from an exhaust hole of a 2.4-liter straight-six-cylinder engine. An A/F at the catalyst entry part was set to be in a range of 10.6 to 18.6, which range encompassed a range of an oxygen-excess atmosphere. The durability process was carried out so that (i) the highest temperature of the catalyst bed was 950° C. and (ii) the durability process was carried out for 50 hours.

<Evaluation of Capability of Exhaust Gas Purification Catalyst>

Each of the catalysts A, B, and C was placed 30 cm downstream from the exhaust hole of a 2.4-liter six-cylinder MPI engine. A vehicle employing the engine was driven twice in an LA-4 mode shown in FIG. 11 (FIG. 12 shows how a temperature at the catalyst entry part changed while the vehicle was driven in the LA-4 mode). In the second driving, CO, HC, and NO, exhausted from a catalyst exit part, was sampled by a CVS method during a time period from a time when the LA-4 mode was started to a time when the LA-4 mode was ended.

Figure 11:
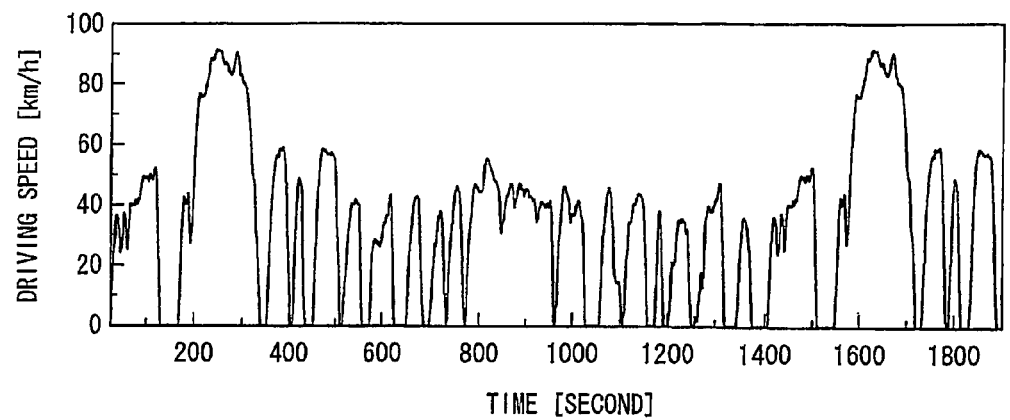
FIG. 11 is a view showing how a driving speed of a vehicle changes while the vehicle is driven in an LA-4 mode.
Figure 12:
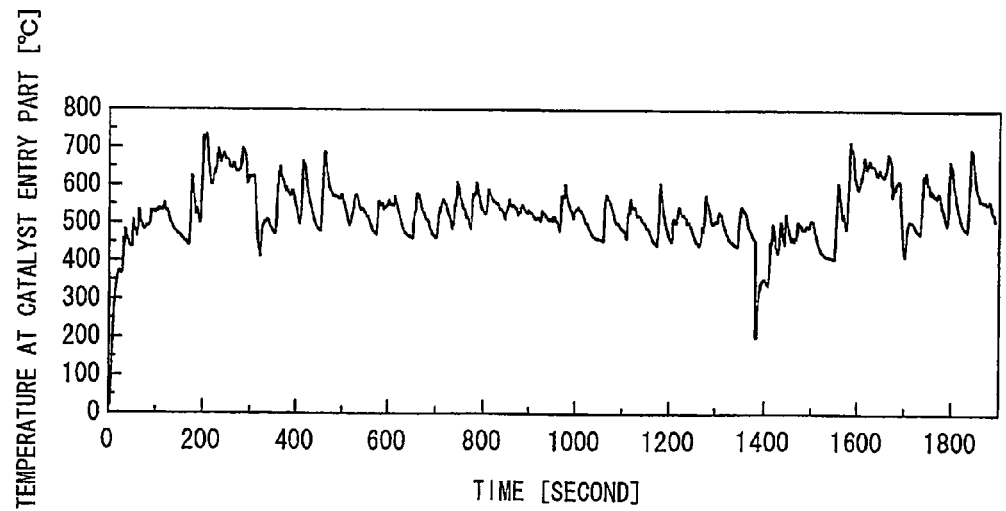
FIG. 12 is a view showing how a temperature changes at a catalyst entry part while the vehicle is being driven in the LA-4 mode.
Figure 13:
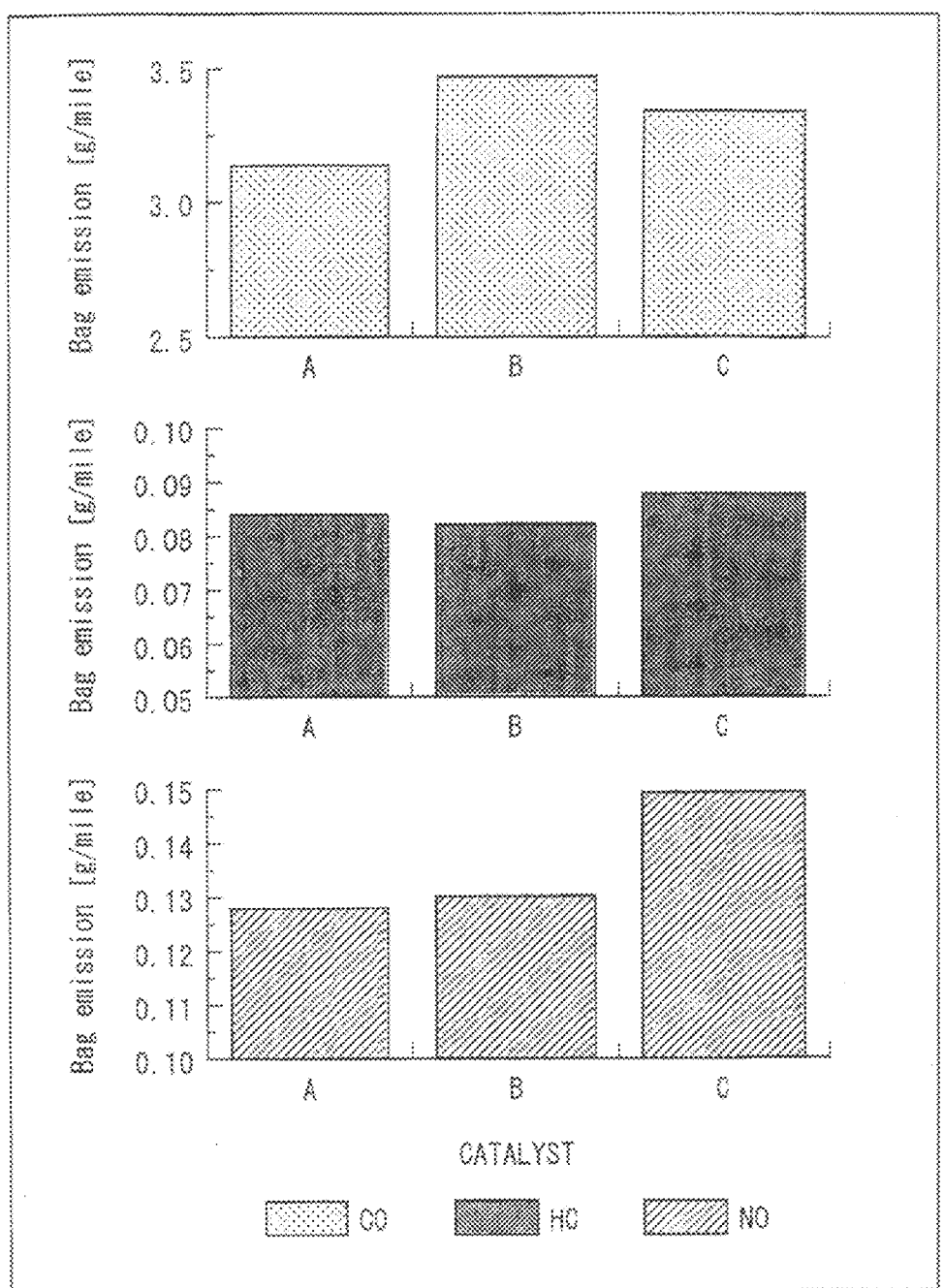
FIG. 13 is a view showing a mass (Bag emission) of each gas exhausted per mile (travel distance).

FIG. 11 shows how a driving speed at which the vehicle was driven in the LA-4 mode changed as a time elapsed. In FIG. 11, a horizontal axis indicates a time period (second) elapsed from a time when the LA-4 mode driving was started, and a vertical axis indicates the driving speed at which the vehicle was driven in the LA-4 mode. FIG. 12 is a view showing how a temperature at the catalyst entry part changed while the vehicle was driven in the LA-4 mode. In FIG. 12, a horizontal axis indicates a time period (second) elapsed from the time when the LA-4 mode driving was started, and a vertical axis indicates the temperature at the catalyst entry part. FIG. 13 is a view showing, for each of the catalysts A, B, and C, a mass (Bag emission) of each gas exhausted per mile. On the horizontal axes in FIG. 13, "A" indicates the catalyst A produced with the powder A, "B" indicates the catalyst B produced with the powder B, and "C" indicates the catalyst C produced with the powder C.

FIG. 13 shows that among the catalysts A, B, and C, the catalyst A reduced an CO exhaust amount and a NO exhaust amount the most, which catalyst A contained the powder A in which the coated state of rhodium was maintained by inhibiting rhodium from being mixed in alumina and therefore inhibiting rhodium from forming a solid solution in combination with alumina.

(II) Catalyst Containing Complex Coated with Lanthanum-Containing Alumina

The following description deals with, by citing Examples and Comparative Examples, a catalyst containing a precious metal-cerium oxide complex coated with lanthanum-containing alumina, so that the present invention can be further clearly understood. Note, however, that the present invention is not limited to the following Examples.

Production of Exhaust Gas Purification Catalyst (1)

Example 3

Aluminum isopropoxide (material of alumina), a rhodium nitrate aqueous solution (material of rhodium), a lanthanum acetate (material of lanthanum), and a cerium (III) acetate (material of a cerium oxide) were used.

The materials were weighed so that a mass ratio of alumina:rhodium:lanthanum oxide:cerium oxide was adjusted to be 82.5:4.5:3:10. The weighed aluminum isopropoxide was added to ethanol whose mass was equal to that of the weighed aluminum isopropoxide, and the resultant solution was agitated for 10 minutes. Then, a mixed solution of the cerium acetate and the rhodium nitrate aqueous solution was added to the aluminum isopropoxide/ethanol solution.

Next, the lanthanum acetate was dispersed in water whose mass was equal to a mass necessary for hydrolysis reaction of the weighed aluminum isopropoxide, and the resultant dispersion liquid was added to the aluminum isopropoxide/ethanol/rhodium nitrate/cerium acetate solution. The mixed solution was agitated for 2 hours. A gel was thus obtained. The gel thus obtained was dried at 120° C. for 8 hours, and the dried object was baked at 500° C. for 1 hour under the presence of an atmosphere. Powder D in which the complex made of the cerium oxide and rhodium was coated with lanthanum-containing alumina was thus obtained.

Example 4

Powder E in which the complex made of the cerium oxide and rhodium was coated with lanthanum-containing alumina was obtained in the same manner as Example 1, except that the mass ratio of alumina:rhodium:lanthanum oxide:cerium oxide was adjusted to be 87.5:4.5:3:5.

Reference Example 1

Aluminum isopropoxide (material of alumina), a rhodium nitrate aqueous solution (material of rhodium), and a lanthanum acetate (material of lanthanum) were used.

The materials were weighed so that a mass ratio of alumina:rhodium:lanthanum oxide was adjusted to be 92.5:4.5:3. The weighed aluminum isopropoxide was added to ethanol whose mass was equal to that of the weighed aluminum isopropoxide, and the resultant solution was agitated for 10 minutes. Then, the rhodium nitrate aqueous solution was added to the aluminum isopropoxide/ethanol solution.

Next, the lanthanum acetate was dispersed in water whose mass was equal to a mass necessary for hydrolysis reaction of the weighed aluminum isopropoxide, and the resultant solution was added to the aluminum isopropoxide/ethanol/rhodium nitrate solution. The mixed solution was agitated for 2 hours. A gel was thus obtained. The gel thus obtained was dried at 120° C. for 8 hours, and the dried object was baked at 500° C. for 1 hour under the presence of an atmosphere. Powder F in which rhodium was coated with lanthanum-containing alumina was thus obtained.

Comparative Example 5

Lanthanum-containing alumina (material of alumina, material of lanthanum) and a rhodium nitrate (material of rhodium) were used.

The materials were weighed so that a mass ratio of alumina:rhodium:lanthanum oxide was adjusted to be 92.5:4.5:3. Next, the rhodium nitrate was supported on the weighed lanthanum-containing alumina by a pore filling method (see Dictionary of Catalyst, Page 174, Asakura Shoten). The resultant solution was dried at 120° C. for 8 hours, and was baked at 500° C. for 1 hour under the presence of an atmosphere. Powder G in which the rhodium was supported on lanthanum-containing alumina by impregnation was thus obtained.

Comparative Example 6

Aluminum isopropoxide (material of alumina), a rhodium nitrate aqueous solution (material of rhodium), a lanthanum acetate (material of lanthanum), and a cerium oxide (material of a cerium oxide) were used.

The materials were weighed so that a mass ratio of alumina:rhodium:lanthanum oxide:cerium oxide was adjusted to be 82.5:4.5:3:10. The weighed aluminum isopropoxide was added to ethanol whose mass was equal to that of the weighed aluminum isopropoxide, and the resultant solution was agitated for 10 minutes. Then, the rhodium nitrate aqueous solution was added to the aluminum isopropoxide/ethanol solution.

Next, the lanthanum acetate was dispersed in water whose mass was equal to a mass necessary for hydrolysis reaction of the weighed aluminum isopropoxide, and the dispersion liquid was added to the aluminum isopropoxide/ethanol/rhodium nitrate solution. The mixed solution was agitated for 2 hours. A reactant was thus obtained. The reactant thus obtained was dried at 120° C. for 8 hours, and the dried object was baked at 500° C. for 1 hour under the presence of an atmosphere. Then, the obtained object was mixed with the weighed cerium oxide, and the mixture was milled in a mortar. Powder H (i) which contained the cerium oxide and (ii) in which rhodium was coated with lanthanum-containing alumina was thus obtained. The powder H contained the cerium oxide that was not coated with lanthanum-containing alumina.

Comparative Example 7

Powder I (i) which contained the cerium oxide and (ii) in which rhodium was coated with lanthanum-containing alumina was obtained in the same manner as Comparative Example 6, except that the mass ratio of alumina:rhodium:lanthanum oxide:cerium oxide was adjusted to be 87.5:4.5:3:5. The powder I contained the cerium oxide that was not coated with lanthanum-containing alumina, like the powder H of Comparative Example 6.

<Confirmation of Powder Component (X-Ray Diffraction Analysis)>

Components of the powder obtained in each of Examples 3 and 4, Reference Example 1, and Comparative Examples 5 through 7 were subjected to X-ray diffraction, so as to check whether $CeO_2$ and CeRh were present or absent in that powder. As an X-ray diffractometer, X 'Pert PRO (manufactured by Spectris Co., Ltd.) was used. As an X-ray source, $CuK\alpha$ was used. The measurement was carried out with an X-ray (40 mA, 45 kV) and a step angle of 0.017°.

In the X-ray diffraction pattern thus obtained, $CeO_2$ has its peak at an angle indicated by JCPDS file No. 00-034-0394, while CeRh has its peak at an angle indicated by JCPDS file No. 00-019-0296. In a case where $CeO_2$ and CeRh are contained in a measurement sample, the peaks are detected at the respective angles indicated by the JCPDS files. In the present Example, however, $Al_2O_3$ and $La_2O_3$ were also contained in the measurement sample in addition to $CeO_2$ and CeRh. Therefore, the peaks may not be clearly detected at a diffraction angle having a lower intensity ratio than those of $Al_2O_3$ and $La_2O_3$. For this reason, in the present Example, an intensity of the peak was measured at the diffraction angle (28.5547°) (±0.017° for $CeO_2$, and) 32.7652° (±0.017° for CeRh) indicating a maximum intensity of each of $CeO_2$ and CeRh.

In each of the powder D produced in Example 3 and the powder E produced in Example 4, the complex made of the cerium oxide and rhodium was coated with lanthanum-containing alumina. As illustrated in (a) of FIG. 3, in each of the powders D and E, the precious metal 2' and the cerium oxide 3' were supported while being adjacent to each other. Therefore, the complex was formed. The powders D and E were subjected to qualitative analysis by the X-ray diffraction analysis after being subjected to a high-temperature durability process. As a result, a peak belonging to CeRh was detected. Since the CeRh compound was formed on the interface between cerium oxide particles and rhodium particles, it was confirmed that the complex made of the cerium oxide and rhodium was coated with lanthanum-containing alumina.

Meanwhile, each of the powder H of Comparative Example 6 and the powder I of Comparative Example 7 was produced such that (i) rhodium was coated with lanthanum-containing alumina, and then (ii) the cerium oxide was physically mixed with rhodium coated with lanthanum-containing alumina. As illustrated in FIG. 4, in each of the powders H and I, the cerium oxide 3' was supported but not adjacent to the precious metal 2'. The powders H and I were subjected to the qualitative analysis by the X-ray diffraction analysis after being subjected to the high-temperature durability process. As a result, no peak belonging to CeRh was detected, whereas the peak belonging to $CeO_2$ was detected with a relatively high intensity. It is believed that the foregoing result was based on the fact that (i) rhodium and the cerium oxide were supported but not adjacent to each other, and therefore (ii) a large part of these did not exist as the CeRh compound but $CeO_2$.

In the powder D produced in Comparative Example 5, the precious metal was supported by immersing an existing carrier in a precious metal solution (by the impregnation method, for example). As illustrated in FIG. 5, in the powder D, a large part of the precious metal particles were supported on the carrier. The powder D was subjected to qualitative analysis by the X-ray diffraction analysis after being subjected to the high-temperature durability process. As a result, the peak belonging to the cerium oxide was detected more clearly, and therefore it was difficult to detect the peak belonging to CeRh.

Further, a ratio of the intensity of the peak belonging to $CeO_2$ to the intensity of the peak belonging to CeRh was found for each of the powders. Table 2 shows the result.

TABLE 2

|  | 1. $CeO_2$ | 2. CeRh | 1/2 |
|---|---|---|---|
| Powder D (Example 3) | 569 | 229 | 2.5 |
| Powder E (Example 4) | 202 | 182 | 1.1 |
| Powder F (Reference Example 1) | Not found | Not found | — |
| Powder H (Comparative Example 6) | 1399 | 117 | 12.0 |
| Powder I (Comparative Example 7) | 659 | 200 | 3.3 |

TABLE 2-continued

|  | 1. $CeO_2$ | 2. CeRh | 1/2 |
|---|---|---|---|

Table 2 shows that each of the powders D and E, in which the complex made of the cerium oxide and rhodium was coated with lanthanum-containing alumina, had a higher ratio of CeRh to $CeO_2$, as compared with the powders H and I, in which the cerium oxide was not coated with lanthanum-containing alumina.

<Measurement of Exposed Surface Area of Precious Metal>

The exposed surface area of the precious metal was measured basically in accordance with a CO pulse method, proposed by the Committee on Reference Catalyst of the Catalysis Society of Japan (Catalyst, 1986, vol. 28, No. 1). In the present example, the precious metal was coated with alumina. Therefore, in order to sufficiently develop a process prior to a process for reducing the precious metal, a temperature at which the reducing process was carried out was set to be 500° C.

Table 3 shows (i) a result of the measurement of an exposed surface area, carried out for each of the powders D, E, F, and G, by the foregoing method for measuring the exposed surface area of the precious metal, which measurement was carried out before/after the high temperature durability process, and (ii) a reduction rate of the exposed surface area of the precious metal through the high-temperature durability process, which reduction rate was calculated for each of the powders D, E, F, and G, in accordance with the foregoing Formula (2).

TABLE 3

|  | Before high-temperature durability process [m²/g] | After high-temperature durability process [m²/g] | Reduction rate [%] |
|---|---|---|---|
| Powder D (Example 3) | 13.3 | 8.6 | 35.6 |
| Powder E (Example 4) | 13.9 | 7.8 | 43.9 |
| Powder F (Reference Example 1) | 14.1 | 8.0 | 43.6 |
| Powder G (Comparative Example 5) | 33.9 | 4.3 | 87.2 |

Table 3 shows that each of the powder D in which the complex made of the cerium oxide and rhodium was coated with lanthanum-containing alumina, the powder E in which the complex made of the cerium oxide and rhodium was coated with lanthanum-containing alumina, and the powder F in which rhodium was coated with lanthanum-containing alumina had a smaller exposed surface area of rhodium than that of the powder G in which rhodium was supported by the impregnation by the pore filling method.

Here, the powders D, E, F, and G had the same amount of rhodium, but each of the powders D, E, and F had a significantly smaller exposed surface area of rhodium than that of the powder G in which rhodium was supported by the impregnation, before the powders D, E, F, and G were subjected to the durability process at a temperature at which the rhodium particles aggregate together into larger blocks due to the sintering. This fact shows that the rhodium particles were coated with alumina in each of the powders D, E, and F.

On the other hand, after the powders D, E, F, and G were subjected to the high-temperature durability process at 950° C. for 50 hours under the presence of an atmosphere, the powder G (in which rhodium was supported on lanthanum-containing alumina by the impregnation by the pore filling method) had a smaller exposed surface area of rhodium, as compared with the powder D (in which the complex made of the cerium oxide and rhodium was coated with lanthanum-containing alumina), the powder E (in which the complex made of the cerium oxide and rhodium was coated with lanthanum-containing alumina), and the powder F (in which only rhodium was coated with lanthanum-containing alumina) (see Table 2).

Each of the powder D (in which complex made of the cerium oxide and rhodium was coated with lanthanum-containing alumina), the powder E (in which complex made of the cerium oxide and rhodium was coated with lanthanum-containing alumina), and the powder F (in which rhodium was coated with lanthanum-containing alumina) had a reduction in exposed surface area of the precious metal through the high-temperature durability process. However, the reduction rate of each of the powders D, E, and F was lower than that of the powder G in which rhodium was supported on lanthanum-containing alumina by the impregnation by the pore filling method. That is, it was found that each of the powders D, E, and F maintained its exposed surface area of the precious metal by inhibiting the sintering of the rhodium particles.

In contrast, with the powder G in which rhodium was supported on lanthanum-containing alumina by the impregnation, a reduction rate of the exposed surface area of rhodium was more than 87% through the high-temperature durability process. That is, it was highly possible that the sintering of the rhodium particles was significantly developed.

Production of Exhaust Gas Purification Catalyst (2)

The exhaust gas purification catalyst produced in each of Examples 3 and 4, Reference Example 1, and Comparative Examples 5 through 7 (i.e. the powders D through I) was used so as to produce an exhaust gas purification catalyst that further contained another component(s).

Example 5

Dinitro-diammine platinum aqueous solution (material of platinum), a palladium nitrate (material of palladium), lanthanum (3% by mass)-containing alumina (material of alumina), a $CeO_2$—$ZrO_2$ composite oxide, and the powder D were weighed so that a mass ratio of Pt:Pd:$La_2O_3$—$Al_2O_3$:$CeO_2$—$ZrO_2$:$La_2O_3$:powder D was adjusted to be 0.06:0.2:31.2:30:5.04:4. Next, the materials were mixed with each other, and the mixed solution was agitated for 2 hours. Then, the mixed solution was subjected to wet milling. A slurry D was thus obtained. The slurry D thus obtained was applied to 0.92 L of cordierite by washcoating so that 70.5 g of the slurry D was provided per liter of cordierite after the slurry D was baked at 500° C. for 1 hour in the following step. After being dried at 150° C. for 15 minutes, the slurry was baked at 500° C. for 1 hour under the presence of an atmosphere. An exhaust gas purification catalyst D which contained, per liter of the exhaust gas purification catalyst D, 0.06 g of Pt, 0.2 g of Pd, and 0.24 g of Rh, was thus obtained.

Example 6

An exhaust gas purification catalyst E was produced by the same method and by use of the same ratio of materials as in Example 5, except that the powder E was used in place of powder D.

Reference Example 2

An exhaust gas purification catalyst F was produced by the same method and by use of the same ratio of materials as in Example 5, except that the powder F was used in place of the powder D.

Comparative Example 8

An exhaust gas purification catalyst G was produced by the same method and by use of the same ratio of materials as in Example 5, except that the powder G was used in place of the powder D.

<Evaluation of Capability of Exhaust Gas Purification Catalyst>

A capability of each of the foregoing exhaust gas purification catalyst was evaluated by measuring (i) a temperature (hereinafter, referred to as "T50" in some cases) at which an NOx purification percentage reached 50%, and (ii) an oxygen absorption. The following description deals with how to measure the T50 and the oxygen absorption.

(Durability Process)

Each of the catalysts of Examples 5 and 6, Reference Example 2, and Comparative Example 8 was placed 40 cm downstream from an exhaust hole of a 2.4-liter straight-six-cylinder engine, and a temperature of a catalyst bed was set to be 950° C. A durability process was carried out under such a condition that (i) an A/F at a catalyst entry part was 14.6 (±4.0), and (ii) the engine was driven for 50 hours.

(Measurement of T50)

The T50 is a temperature at which the NOx purification percentage reached 50%. How to measure the T50 is described below. Each of the exhaust gas purification catalysts that had been subjected to the durability process was placed 30 cm downstream from an exhaust hole of a 3.0-liter six-cylinder MPI engine. Under the condition that (i) an A/F was in a range of 14.1 to 15.1, and (ii) a frequency was 1.0 Hz, the MPI engine was driven. As the engine was driven, a temperature at the catalyst entry part was increased from 200° C. to 500° C. at a temperature increase rate of 50° C./minute. As the temperature at the catalyst entry part was increased from 200° C. to 500° C., the purification percentage of each of CO, THC (Total Hydrocarbon, in terms of methane), and NOx was calculated. The temperature at which the NOx purification percentage reached 50% was used as the T50.

Note that the "catalyst entry part" was an internal part of an exhaust pipe, which internal part has a space provided (i) between an end surface of the placed catalyst on an exhaust gas inflow side and a plane 20 cm away from the end surface toward the internal-combustion engine, and (ii) at the center of a cross-sectional shape of the exhaust pipe. Note that the "temperature at the catalyst entry part" was a temperature measured at the position of the catalyst entry part by use of a thermocouple. The lower the T50 is, the higher the catalyst capability of the exhaust gas purification catalyst is.

(Measurement of 50% Purification Temperature (T50))

Figure 14:
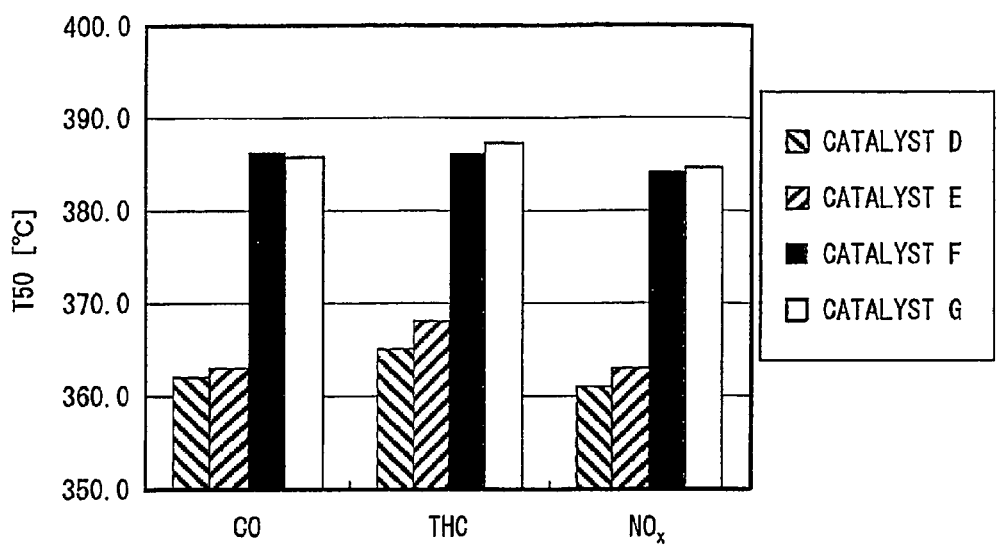
FIG. 14 is a graph showing 50% purification temperatures (T50) in temperature increase evaluation for exhaust gas purification catalysts produced in Examples.

FIG. 14 shows a result of the measurement of the 50% purification temperature (T50) in temperature rise evaluation, which measurement was carried out for each of the catalysts D, E, F, and G.

As shown in FIG. 14, the exhaust gas purification catalyst containing the powder D or E, in which the complex made of the cerium oxide and rhodium was coated with lanthanum-containing alumina had a lower 50% purification temperature than that of the catalyst containing the powder F in which only rhodium was coated with lanthanum-containing alumina or the powder G in which the rhodium nitrate was supported on lanthanum-containing alumina by the impregnation. In other words, the catalyst containing the powder D or E had a higher catalyst capability than that of the catalyst containing the powder F or G.

(Measurement of Oxygen Absorption)

The oxygen absorption was a value obtained in such a manner that (i) a ratio of a full length of an oxygen curve at the catalyst entry part of the exhaust gas purification catalyst with respect to a full length of an oxygen curve at the catalyst exit part of the exhaust gas purification catalyst was obtained, (ii) the ratio was subtracted from 1, and (iii) the value thus obtained was multiplied by 100. The oxygen absorption can be obtained by use of the following Formula (4).

[Formula 4]

$$\text{Oxygen absorption } [\%] = \left(1 - \left(\frac{\text{Full length of oxygen curve at catalyst exit part}}{\text{Full length of oxygen curve at catalyst entry part}}\right)\right) \times 100 \quad (4)$$

The following description explains how to find the "oxygen curve at the catalyst exit part" and the "oxygen curve at the catalyst entry part" in detail.

After the T50 was measured, the temperature at the catalyst entry part was set to be 400° C. As the MPI engine was driven at an A/F in a range of 14.1 to 15.1 at a frequency of 0.5 Hz, the oxygen concentration was measured per 0.1 second both at the catalyst entry part and at the catalyst exit part. Then, the temperature at the catalyst entry part was set to be 400° C. As the MPI engine was driven at an A/F in a range of 13.6 to 15.6 at a frequency of 0.5 Hz, the oxygen concentration was measured per 0.1 second both at the catalyst entry part and at the catalyst exit part. Then, the temperature at the catalyst entry part was set to be 500° C. Similarly, as the MPI engine was driven at an A/F in a range of 14.1 to 15.1 or in a range of 13.6 to 15.6 at a frequency of 0.5 Hz, the oxygen concentration was measured per 0.1 second both at the catalyst entry part and at the catalyst exit part. On the basis of the oxygen concentrations obtained at the catalyst entry part under each of the conditions described above, a curve was obtained by use of a least square method.

In a similar manner, on the basis of the oxygen concentrations obtained at the catalyst exit part, a curve was obtained by use of the least square method. The obtained curves are hereinafter referred to as "oxygen curves". For each of the oxygen curves thus obtained, a length defined by a time period from a time when 20 seconds elapsed since the measurement start time to a time when 180 seconds elapsed since the measurement start time was obtained.

Specifically, the length $L_{20}$ of the oxygen curve defined by the time period from the time when 20 seconds elapsed since the measurement start time to the time when 20.1 seconds elapsed since the measurement start time can be expressed by the following formula (5) by use of Pythagorean theorem, where "$O_{20}$" is the oxygen concentration at the catalyst entry part, obtained when 20 seconds elapsed since the measurement start time, and "$O_{20.1}$" is the oxygen concentration at the catalyst entry part, obtained when 20.1 seconds elapsed since the measurement start time. Note that the length $L_{20}$ of the oxygen curve is a positive value.

[Formula 5]

$$L_{20} = \sqrt{(O_{20+0.1} - O_{20})^2 + 0.1^2} \quad (5)$$

In the similar manner, it is possible to find a full length of the oxygen curve defined by the time period from the time when 20 seconds elapsed since the measurement start time to the time when 180 seconds elapsed since the measurement start time, by (i) finding the length of the oxygen curve per 0.1 second, and (ii) summing up the lengths thus obtained from $L_{20}$ to $L_{179.9}$. That is, the full length of the oxygen curve at the catalyst entry part, defined by the time period from the time when 20 seconds elapsed since the measurement start time to the time when 180 seconds elapsed since the measurement start time, can be represented by the following formula (6).

[Formula 6]

$$\text{Full length of oxygen curve} = L_{20} + L_{20.1} + L_{20.2} + \ldots + L_{179.9} \quad (6)$$

Similarly, the full length of the oxygen curve at the catalyst exit part, defined by the time period from the time when 20 seconds elapsed since the measurement start time to the time when 180 seconds elapsed since the measurement start time, can be obtained. Then, the oxygen absorption can be obtained by use of the foregoing Formula (4).

As the exhaust gas purification catalyst has a higher oxygen absorption ability, the full length of the oxygen curve at the catalyst exit part, defined by the time period from the time when 20 seconds elapsed since the measurement start time to the time when 180 seconds elapsed since the measurement start time, becomes shorter as compared with that of the oxygen curve at the catalyst entry part, defined by the time period from the time when 20 seconds elapsed since the measurement start time to the time when 180 seconds elapsed since the measurement start time. As a result, the obtained value of the oxygen absorption becomes higher.

(Measurement of Oxygen Absorption)

Figure 15:
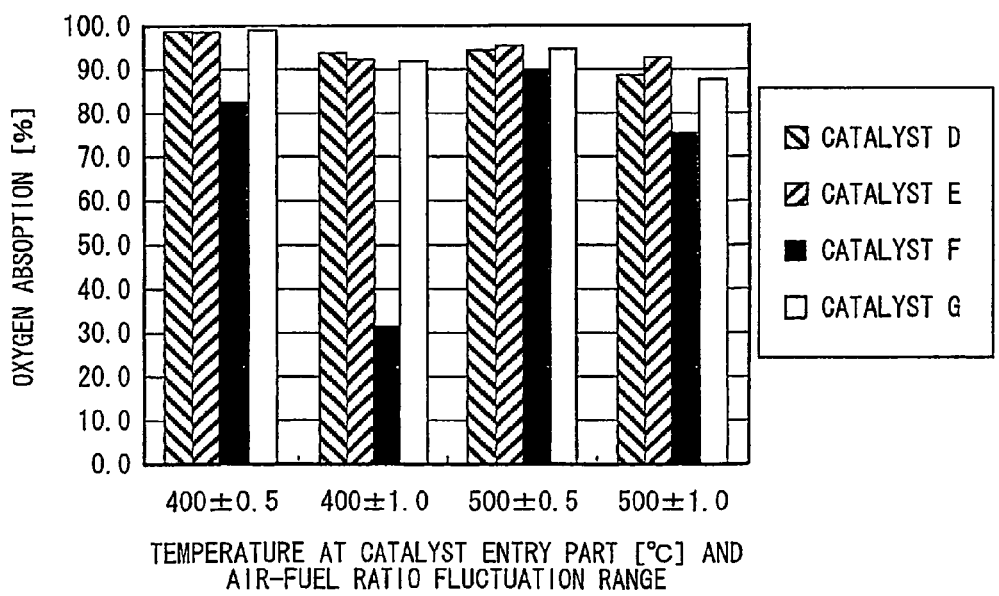
FIG. 15 is a graph showing oxygen absorptions of the exhaust gas purification catalysts produced in Examples.

FIG. 15 shows a result of the measurement of the oxygen absorption of the exhaust gas purification catalyst. In FIG. 15, a horizontal axis indicates a temperature at the catalyst entry part (400° C., 500° C.) and an air-fuel ratio fluctuation range (±0.5: A/F=14.1-15.1, ±1.0: A/F=13.6-15.6), and a vertical axis indicates an oxygen absorption (%).

As shown in FIG. 15, the exhaust gas purification catalyst containing the powder D or E, in which the complex made of the cerium oxide and rhodium was coated with lanthanum-containing alumina, had a higher oxygen absorption (%) than that of the exhaust gas purification catalyst containing the powder F in which only rhodium was coated with lanthanum-containing alumina. Meanwhile, the exhaust gas purification catalyst containing the powder G in which rhodium nitrate was supported on lanthanum-containing alumina by the impregnation exhibited a high oxygen absorption (%), although the powder G had a structure which did not contain the complex made of the cerium oxide and rhodium, like the powder F. It is believed that the exhaust gas purification catalyst containing the powder G has a high oxygen absorption.

Production of Exhaust Gas Purification Catalyst (3)

In order to check how the pore diameter and the pore volume influence the exhaust gas purification catalyst, the following Examples, employing the pore diameter in a predetermined range and the pore volume in a predetermined range, and the following Comparative Examples were carried out so that the present invention is further explained in detail. Note that an alumina sol employed in the following Examples, Reference Examples, and Comparative Examples contained nitric acid as a stabilizing agent.

(Measurement of Pore Size Distribution)

Pore size distribution of each of the catalysts was produced by the following method, and was measured by a mercury penetration method (see "Catalyst Handbook", the Catalysis Society of Japan, Kodansha, 2008, Page 144).

Note that in order to distinguish the pores of the catalyst and the pores of the three-dimensional structure (such as a cordierite carrier), the measurement was carried out after only the catalyst components were separated from the three-dimensional structure.

Example 7

An alumina sol (material of alumina, serving as a coating material) which (i) contained $NO_3^-$ as a stabilizing agent, and (ii) had a pH4, the alumina sol being stable in a range of pH3 to pH5, a rhodium nitrate aqueous solution (material of rhodium), a lanthanum acetate (material of lanthanum), and a cerium (III) acetate (hereinafter, referred to as "cerium acetate") (material of a cerium oxide) were weighed so that a mass ratio of alumina:rhodium:lanthanum oxide:cerium oxide was adjusted to be 3.0:0.06:0.96:1.2.

Next, the rhodium nitrate and the cerium acetate were mixed with each other, and the mixed solution was added to the alumina sol. Immediately after the addition of the mixed solution, gelatification of the alumina sol was started to be developed. A gel in which the rhodium oxide and the cerium acetate were coated with the alumina gel was thus obtained. After the gel was agitated for 5 minutes, the lanthanum acetate was added to the gel. The mixed solution was further agitated for 10 minutes. As a result, a gel j in which the rhodium nitrate and the cerium acetate were coated with an alumina layer containing the lanthanum acetate was obtained. Here, a viscosity of the gel j was 12,800 cP.

Figure 16:
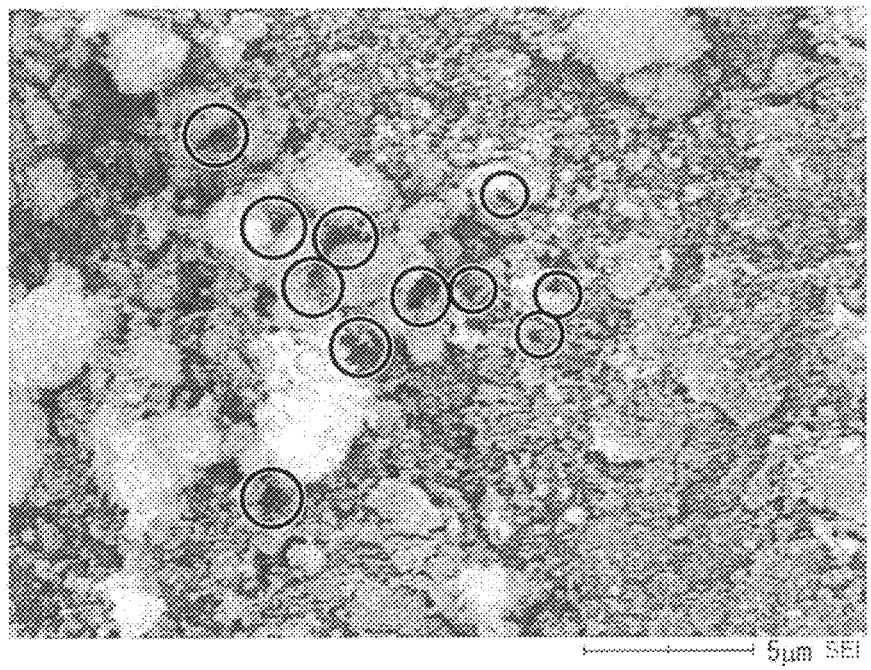
FIG. 16 is a view showing a TEM photograph of an exhaust gas purification catalyst produced in Example 7.

Then, the gel j, a zirconium oxide, a ceria-zirconia composite oxide, and alumina were weighed so that a mass ratio of gel j:zirconium oxide:ceria-zirconia composite oxide:alumina was adjusted to be 5.22:23.28:30:31.5. These were subjected to wet milling so that a slurry was obtained. The slurry was applied to 0.875 L of a cordierite carrier by washcoating, dried at 150° C. for 10 minutes, and then baked at 500° C. for 1 hour. A catalyst J in which 78.75 g of a catalyst component was coated was thus obtained. A pore volume and pore size distribution of the catalyst J were measured. Table 4 shows a result of the measurement. FIG. 16 is a TEM photograph of the catalyst J.

Example 8

Aluminum isopropoxide (material of alumina, serving as a coating material), a rhodium nitrate aqueous solution (material of rhodium), a lanthanum acetate (material of lanthanum), and a cerium acetate (material of a cerium oxide) were weighed so that a mass ratio of alumina:rhodium:lanthanum oxide:cerium oxide was adjusted to be 11.45:0.06:0.96:1.2.

The weighed aluminum isopropoxide was added to ethanol whose mass was equal to that of the weighed aluminum isopropoxide, and the resultant solution was agitated for 10 minutes. Then, a mixed solution of the cerium acetate and the rhodium nitrate aqueous solution was added to the aluminum isopropoxide/ethanol solution.

Next, the lanthanum acetate was dispersed in water whose mass was equal to a mass necessary for hydrolysis reaction of the weighed aluminum isopropoxide, and the dispersion solution thus obtained was added to the aluminum isopropoxide/ethanol/rhodium nitrate/cerium acetate solution. The mixed solution was agitated for 2 hours so that a gel was obtained. The gel thus obtained was dried at 120° C. for 8 hours, and the dried object was baked at 500° C. for 1 hour under the presence of an atmosphere. Powder k in which the complex made of the cerium oxide and rhodium was coated with lanthanum-containing alumina was thus obtained.

The powder k, a zirconium oxide, a ceria-zirconia composite oxide, and alumina were weighed so that a mass ratio of powder k:zirconium oxide:ceria-zirconium composite oxide:alumina was adjusted to be 13.67:23.28:30:23.05. These were subjected to wet milling so that a slurry was obtained. The slurry was applied to 0.875 L of a cordierite carrier by washcoating, dried at 150° C. for 10 minutes, and then baked at 500° C. for 1 hour under the presence of an atmosphere. A catalyst K in which 78.75 g of the catalyst component was coated was thus obtained. A pore volume and pore size distribution of the catalyst K were measured. Table 4 shows a result of the measurement.

Reference Example 3

An alumina sol (material of alumina, serving as a coating material) which was identical with the one used in Example 7, a rhodium nitrate aqueous solution (material of rhodium), a lanthanum acetate (material of lanthanum), and a cerium acetate (material of a cerium oxide) were weighed so that a mass ratio of alumina:rhodium:lanthanum oxide:cerium oxide was adjusted to be 11.45:0.06:0.96:1.2.

Next, the rhodium nitrate and the cerium acetate were mixed with each other, and the mixed solution was added the alumina sol. Immediately after the addition of the mixed solution, the gelatification of the alumina sol was started to be developed. A gel in which the rhodium nitrate and the cerium acetate were coated with the alumina gel was thus obtained. The gel was agitated for 5 minutes. Then, the lanthanum acetate was added to the gel, and the resultant solution was further agitated for 10 minutes. A gel I in which the rhodium nitrate and the cerium acetate were coated with an alumina layer that contains the lanthanum acetate was thus obtained. Here, a viscosity of the gel I was 21,600 cP.

Figure 17:
FIG. 17 is a view showing a TEM photograph of an exhaust gas purification catalyst produced in Reference Example 3.

Next, the gel I, a zirconium oxide, a ceria-zirconia composite oxide, and alumina were weighed so that a mass ratio of gel I:zirconium oxide:ceria-zirconia composite oxide:alumina was adjusted to be 13.67:23.28:30:23.05. These were subjected to wet milling so that a slurry was obtained. The slurry was applied to 0.875 L of a cordierite carrier by washcoating, dried at 150° C. for 10 minutes, and then baked at 500° C. for 1 hour under the presence of an atmosphere. A catalyst L in which 78.75 g of the catalyst component was coated was thus obtained. A pore volume and pore size distribution of the catalyst L were measured. Table 4 shows a result of the measurement. FIG. 17 is a TEM photograph of the catalyst L.

Comparative Example 9

Lanthanum oxide (3% by mass)-containing alumina (material of alumina, serving as a coating material), a rhodium nitrate aqueous solution (material of rhodium), a zirconium oxide, and a ceria-zirconia composite oxide were weighed so that a mass ratio of alumina:rhodium:zirconium oxide:ceria-zirconia composite oxide was adjusted to be 35.34:0.06:20:34.

Next, these materials were subjected to wet milling so that a slurry was obtained. The slurry was applied to 0:875 L of a cordierite carrier by washcoating, dried at 150° C. for 10 minutes, and then baked at 500° C. for 1 hour under the presence of an atmosphere. A catalyst M in which 78.75 g of a catalyst component was coated was thus obtained. A pore volume and pore size distribution of the catalyst M were measured. Table 4 shows a result of the measurement.

TABLE 4

| Catalyst | | J | K | L | M |
|---|---|---|---|---|---|
| Contained ratio of pores (%) | -160 nm | 77.91 | 80.26 | 98.14 | 90.85 |
| | 160 nm-200 nm | 2.24 | 2.30 | 0.09 | 0.62 |
| | 200 nm-400 nm | 8.99 | 8.17 | 0.32 | 1.85 |
| | 400 nm-600 nm | 3.63 | 3.05 | 0.09 | 0.71 |
| | 600 nm-800 nm | 1.23 | 1.02 | 0.00 | 0.26 |
| | 800 nm-1000 nm | 1.26 | 0.75 | 0.00 | 0.28 |
| | 1000 nm- | 4.75 | 4.45 | 1.36 | 5.43 |
| Total pore volume (mL/g) | | 0.6039 | 0.5998 | 0.4345 | 0.4656 |

Note that in table 4, "A nm-B nm" means that "not less than A nm but less than B nm". That is, "-160 nm" means "less than 160 nm", "160 nm-200 nm" means "not less than 160 nm but less than 200 nm", and "1000 nm-" means "not less than 1000 nm". This also applies to the following Table 6.

<Durability Process>

Each of the catalysts of Examples 7 and 8, Reference Example 3, and Comparative Example 9 was placed 40 cm downstream from an exhaust hole of a 3.0-liter straight-six-cylinder engine, and a catalyst bed temperature was set to be 1000° C. Under such a condition that an A/F at the catalyst entry part was 14.6 (±4.0), the engine was driven for 48 hours. The durability process was thus carried out.

<Evaluation of Capability of Exhaust Gas Purification Catalyst>

Each of the catalysts that had been subjected to the durability process was placed 30 cm downstream from an exhaust hole of a 2.4-liter straight-six-cylinder engine, and the catalyst bed temperature was set to be 500° C. Under such a condition that (i) an A/F was in a range of 14.1 to 15.1, (ii) an A/F amplitude was ±0.5 or ±1.0, and (iii) a frequency was 0.5 Hz, the engine was driven. As the engine driven, an exhaust gas emitted from the catalyst exit part was continuously sampled. Each of the purification percentages of CO, THC, and NOx was thus calculated. Here, for evaluation of the catalyst capability of each of the exhaust gas purification catalysts, the purification percentage was calculated (i) at a CO—NOx crossover point which was an intersection between a CO purification percentage curve with respect to the A/F value, and an NOx purification percentage curve with respect to the A/F value, and (ii) at a THC—NOx crossover point which was an intersection between a THC purification curve with respect to the A/F value and the NOx purification percentage curve. Table 5 shows a result of the calculation.

TABLE 5

| | CO—NOx (%) | | THC-NOx (%) | |
|---|---|---|---|---|
| Catalyst | Amplitude (±0.5) | Amplitude (±1.0) | Amplitude (±0.5) | Amplitude (±1.0) |
| J | 86.94 | 87.77 | 86.25 | 87.77 |
| K | 88.03 | 89.37 | 87.65 | 89.37 |

TABLE 5-continued

| | CO—NOx (%) | | THC-NOx (%) | |
|---|---|---|---|---|
| Catalyst | Amplitude (±0.5) | Amplitude (±1.0) | Amplitude (±0.5) | Amplitude (±1.0) |
| L | 86.05 | 84.81 | 77.96 | 80.49 |
| M | 85.42 | 85.45 | 78.28 | 80.60 |

As shown in Table 5, each of the catalyst J of Example 7 and the catalyst K of Example 8 had a higher purification percentage at the crossover point than that of each of the catalyst L of Reference Example 3 and the catalyst M of Comparative Example 9.

Production of Exhaust Gas Purification Catalyst (4)

Example 9

An alumina sol (material of alumina, serving as a coating material) which was identical with the one used in Example 7, a palladium nitrate aqueous solution (material of palladium), a lanthanum acetate (material of lanthanum), and a cerium acetate (material of a cerium oxide) were weighed so that a mass ratio of alumina:palladium:lanthanum oxide:cerium oxide was adjusted to be 15.4:2:1.6:4.

Next, the palladium nitrate and the cerium acetate were mixed with each other, and the mixed solution was added to the alumina sol. Immediately after the addition of the mixed solution, gelatification of the alumina sol was started to be developed. A gel in which the palladium nitrate and the cerium acetate were coated with the alumina gel was thus obtained. The gel was agitated for 5 minutes. Then the lanthanum acetate was added to the gel, and the resultant solution was further agitated for 10 minutes. A gel n in which the palladium nitrate and the cerium acetate were coated with an alumina layer that contains the lanthanum acetate was thus obtained. Here, a viscosity of the gel n was 35,600 cP.

Next, a palladium nitrate, the gel n, a ceria-zirconia composite oxide, alumina, and a barium oxide were weighed so that a mass ratio of the palladium nitrate:gel n:ceria-zirconia composite oxide:alumina:barium oxide was adjusted to be 2.4:23:50:47:12. These were subjected to wet milling so that a slurry was obtained. The slurry was applied to 0.875 L of cordierite carrier by washcoating, dried at 150° C. for 10 minutes, and then baked at 500° C. for 1 hour under the presence of an atmosphere. A catalyst N in which 117.6 g of a catalyst component was coated was thus obtained. A pore volume and pore size distribution of the catalyst N were measured. Table 6 shows a result of the measurement.

Reference Example 4

A gel o in which a palladium nitrate and a cerium acetate were coated with an alumina layer that contained a lanthanum acetate was obtained in the same manner as in Example 9, except that a mass ratio of alumina:palladium:lanthanum oxide:cerium oxide was adjusted to be 30.8:2:3.2:4. Next, the gel o was dried at 150° C. for 8 hours, and baked at 500° C. for 1 hour under the presence of an atmosphere. Powder o' was thus obtained.

Next, a palladium nitrate, the powder o', a ceria-zirconia composite oxide, alumina, and a barium oxide were weighed so that a mass ratio of palladium nitrate:powder o':ceria-zirconia composite oxide:alumna:barium oxide was adjusted to be 2.4:23:50:47:12. These were subjected to wet milling so that a slurry was obtained. The slurry was applied to 0.875 L of a cordierite carrier by washcoating, dried at 150° C. for 10 minutes, and baked at 500° C. for 1 hour under the presence of an atmosphere. A catalyst O in which 117.6 g of a catalyst component was coated was thus obtained. A pore volume and pore size distribution of the catalyst O were measured. Table 6 shows a result of the measurement.

Comparative Example 10

The materials identical with those of Example 9 were weighed so that a mass ratio of palladium:cerium oxide:lanthanum oxide:ceria-zirconia composite oxide:alumina:barium oxide was adjusted to be 4.4:4:3.2:50:60.8:12. These were subjected to wet milling so that a slurry was obtained. The slurry thus obtained was applied to 0.875 L of a cordierite carrier by washcoating, dried at 150° C. for 10 minutes, and baked at 500° C. for 1 hour under the presence of an atmosphere. A catalyst P in which 117.6 g of a catalyst component was coated was thus obtained. A pore volume and pore size distribution of the catalyst P were measured. Table 6 shows a result of the measurement.

TABLE 6

| | Catalyst | N | O | P |
|---|---|---|---|---|
| Contained ratio of pores (%) | -160 nm | 88.54 | 95.42 | 96.81 |
| | 160 nm-200 nm | 0.86 | 0.38 | 0.52 |
| | 200 nm-400 nm | 3.79 | 0.74 | 0.86 |
| | 400 nm-600 nm | 2.22 | 0.18 | 0.22 |
| | 600 nm-800 nm | 1.11 | 0.08 | 0.07 |
| | 800 nm-1000 nm | 1.03 | 0.03 | 0.02 |
| | 1000 nm- | 2.44 | 3.17 | 1.48 |
| Total pore volume (mL/g) | | 0.4058 | 0.3909 | 0.4047 |

<Durability Process>

Each of the catalysts of Example 9, Reference Example 4, and Comparative Example 10 was placed 40 cm downstream from an exhaust hole of a 3.0-liter straight-six-cylinder engine, and a catalyst bed temperature was set to be 1000° C. Under such a condition that an A/F at the catalyst entry part was 14.6 (±4.0), the engine was driven for 24 hours. A durability process was thus carried out.

<Evaluation of Capability of Exhaust Gas Purification Catalyst>

Each of the catalysts that had been subjected to the durability process was placed 30 cm downstream from an exhaust hole of a 2.4-liter straight-six-cylinder engine, and a catalyst bed temperature was set to be 400° C. Under such a condition that (i) an A/F was in a range of 14.1 to 15.1, (ii) an A/F amplitude was ±0.5 or ±1, and (iii) a frequency was 0.5 Hz, an exhaust gas emitted from the catalyst exit part was continuously sampled. Each of purification percentages of CO, THC, and NOx was thus worked out. Here, for evaluation of the catalyst capability of each of the exhaust gas purification catalysts, the purification percentage was calculated (i) at a CO—NOx crossover point which was an intersection between a CO purification percentage curve with respect to the A/F value and an NOx purification curve with respect to the A/F value, and (ii) at a THC—NOx crossover point which was an intersection between the THC purification percentage curve with respect to the A/F value and the NOx purification percentage curve. Table 7 shows a result of the calculation.

TABLE 7

| | CO—NOx (%) | | THC-NOx (%) | |
|---|---|---|---|---|
| Catalyst | Amplitude (±0.5) | Amplitude (±1.0) | Amplitude (±0.5) | Amplitude (±1.0) |
| N | 99.50 | 99.39 | 96.08 | 97.12 |
| O | 99.04 | 98.30 | 94.98 | 96.62 |
| P | 99.22 | 98.88 | 95.20 | 96.88 |

<Measurement of T50>

Each of the catalysts that had been subjected to the durability process was placed 30 cm downstream from an exhaust hole of a 2.4-liter straight-six-cylinder engine. Under such a condition that (i) the A/F was in a range of 14.1 to 15.1, and (ii) a frequency was 1.0 Hz, the engine was driven. As the engine was driven, a temperature at the catalyst entry part was increased from 200° C. to 500° C. at a temperature increase speed of 50° C./minute. Here, each of the purification percentages of CO, THC, and NOx was calculated, and a temperature (T50) at which the corresponding purification percentage reached 50% was found.

Note that the "catalyst entry part" is an internal part of an exhaust pipe, which internal part has a space provided (i) between an end surface of the placed catalyst on an exhaust gas inflow side and a plane 20 cm away from the end surface toward the internal-combustion engine, and (ii) at the center of a cross-sectional shape of the exhaust pipe. Further, the "temperature at the catalyst entry part" is a temperature measured at the catalyst entry part by use of a thermocouple. The lower the T50 is, the higher catalyst capability of the exhaust gas purification catalyst is.

Table 8 shows a result of the measurement of T50. As shown in Table 8, the catalyst N of Example 9 had a lower T50 than that of each of the catalyst O of Reference Example 4 and the catalyst P of Comparative Example 9. That is, it was confirmed that the catalyst N exhibited a higher catalyst capability even after the durability process.

TABLE 8

| Catalyst | CO (° C.) | THC (° C.) | NOx (° C.) |
|---|---|---|---|
| N | 360 | 361 | 360 |
| O | 358 | 364 | 361 |
| P | 370 | 375 | 373 |

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

An exhaust gas purification catalyst of the present invention can efficiently purify an exhaust gas emitted from an internal-combustion engine, even at a high temperature. Therefore, the present invention is widely applicable to a general industry employing the internal-combustion engine, such as an automobile, a railway, a ship and a vessel, an airplane, and other various industrial apparatuses.

REFERENCE SIGNS LIST

1: Lanthanum
2: Alumina

3: Rhodium
4: Rhodium that has been mixed in alumina and has formed a solid solution in combination with alumina
1': Lanthanum-containing alumina
2': Precious metal
3' Cerium oxide
4': Compound

The invention claimed is:

1. An exhaust gas purification catalyst comprising:
   a complex comprising a precious metal and a cerium oxide, wherein the complex is coated with a lanthanum-containing alumina, and
   pores having a diameter of 160 nm to less than 1000 nm, which account for 5% to 20% of total pore volume of the catalyst.

2. The catalyst as set forth in claim 1,
   further comprising pores having a diameter of less than 160 nm, which account for 70% to 90% of total pore volume of the catalyst.

3. The catalyst as set forth in claim 1, wherein:
   the catalyst is capable of maintaining the precious metal after the catalyst is exposed to an oxygen-excess gas having a temperature of 950° C. to 1000° C.

4. The catalyst as set forth in claim 3, wherein:
   an exposed surface area of the precious metal is reduced or unchanged when the catalyst is exposed to said gas.

5. The catalyst as set forth in claim 3, wherein:
   20% or less of the precious metal in atomic ratio is mixed into alumina to form a solid solution of alumina and the precious metal after the catalyst is exposed to said gas.

6. The catalyst as set forth in claim 1, further comprising:
   platinum, palladium or a combination thereof.

7. The catalyst as set forth in claim 1, wherein:
   a compound comprising the precious metal and the cerium oxide is formed at an interface between the precious metal and the cerium oxide in the complex.

8. The catalyst as set forth in claim 7, wherein:
   an amount of the cerium oxide contained in the complex is greater than an amount of the compound contained in the complex.

9. The catalyst as set forth in claim 1, wherein:
   an amount of the cerium oxide contained in the complex is 1% by mass to 30% by mass with respect to a total amount of the precious metal, the cerium oxide, lanthanum, and alumina in the catalyst.

10. The catalyst as set forth in claim 1, wherein:
    the catalyst is capable of maintaining the complex after the catalyst is exposed to an exhaust gas having a temperature of 950° C. to 1000° C., and wherein the exhaust gas is emitted from an internal-combustion engine.

11. The catalyst as set forth in claim 10, wherein:
    when the catalyst is exposed to said gas, an exposed surface area of the precious metal is reduced by a percentage of 0% to 87% with respect to an exposed surface area of the precious metal before the exposure of the catalyst to said gas.

12. The catalyst as set forth in claim 11, wherein:
    the catalyst is capable of absorbing 30% to 100% oxygen from said exhaust gas.

13. The catalyst as set forth in claim 1, further comprising:
    platinum, palladium, or a combination thereof, wherein the platinum, palladium or the combination thereof is not coated with lanthanum-containing alumina.

14. The catalyst as set forth in claim 1, wherein:
    the catalyst is supported on a three-dimensional structure.

15. The catalyst as set forth in claim 1, further comprising:
    a fire-resistant inorganic oxide.

16. The catalyst as set forth in claim 15, wherein:
    the fire-resistant inorganic oxide has a melting point of not less than 1000° C.

17. The catalyst as set forth in claim 1, further comprising:
    a cerium oxide, a ceria-zirconia composite oxide or a combination thereof, wherein the cerium oxide, the ceria-zirconia composite oxide or the combination thereof is not coated with lanthanum-containing alumina.

18. The catalyst as set forth in claim 1, wherein:
    the precious metal is rhodium.

19. A method for purifying an exhaust gas, the method comprising the step of:
    exposing an exhaust gas purification catalyst as set forth in claim 1 to an exhaust gas emitted from an internal-combustion engine.

20. A method for purifying an exhaust gas, the method comprising the steps of:
    (i) exposing an exhaust gas purification catalyst as set forth in claim 1 or 2 to a first exhaust gas having (I) a temperature in a range of 800° C. to 1000° C. and (II) an air-fuel ratio in a range of 10 to 18.6; and
    (ii) exposing, after the step (i), the exhaust gas purification catalyst to a second exhaust gas which (1) has a temperature in a range of 0° C. to 750° C., and (2) is emitted from an internal-combustion engine.

21. A method for producing an exhaust gas purification catalyst as set forth in claim 1, the method comprising the step of:
    producing a gel in which a complex comprising a precious metal and a cerium oxide is coated with a lanthanum-containing alumina gel.

22. The method as set forth in claim 21, the method further comprising the steps of:
    turning, into a slurry, the gel in which the complex comprising the precious metal and the cerium oxide is coated with the lanthanum-containing alumina gel;
    coating a three-dimensional structure with the slurry by washcoating; and
    drying and baking the three-dimensional structure which is coated with the slurry.

* * * * *